United States Patent
Abdelhadi et al.

(10) Patent No.: US 12,093,328 B2
(45) Date of Patent: Sep. 17, 2024

(54) PLAYBACK ENGINE

(71) Applicant: Apple Inc., Cupertino, CA (US)

(72) Inventors: Mohammad J. Abdelhadi, Mountain View, CA (US); Ryan J. Allen, San Diego, CA (US); Christopher Y. Brown, San Jose, CA (US); Karl C. Hsu, Cupertino, CA (US); Nur O. Monson, San Ramon, CA (US)

(*) Notice: Subject to any disclaimer, the term of this patent is extended or adjusted under 35 U.S.C. 154(b) by 0 days.

(21) Appl. No.: 18/199,342

(22) Filed: May 18, 2023

(65) Prior Publication Data

US 2023/0376541 A1    Nov. 23, 2023

Related U.S. Application Data

(60) Provisional application No. 63/343,943, filed on May 19, 2022.

(51) Int. Cl.
*G06F 16/00* (2019.01)
*G06F 16/901* (2019.01)
*G06F 16/907* (2019.01)

(52) U.S. Cl.
CPC ........ *G06F 16/907* (2019.01); *G06F 16/9024* (2019.01)

(58) Field of Classification Search
CPC .......................... G06F 16/907; G06F 16/9024
See application file for complete search history.

(56) References Cited

U.S. PATENT DOCUMENTS

| | | | |
|---|---|---|---|
| 7,930,684 B2 * | 4/2011 | Roeck | G06F 11/2046 717/130 |
| 9,237,384 B2 * | 1/2016 | Beckhardt | H04N 21/4432 |
| 9,286,303 B1 * | 3/2016 | Cohen | G06F 16/2228 |
| 10,306,324 B2 * | 5/2019 | Clarke | G11B 27/105 |
| 10,977,018 B1 | 4/2021 | Hwang et al. | |
| 11,176,081 B2 * | 11/2021 | Winston | G06F 8/314 |
| 11,228,414 B1 * | 1/2022 | Nijim | H04L 65/611 |
| 2006/0062363 A1 * | 3/2006 | Albrett | H04N 21/4532 348/E7.071 |
| 2010/0011117 A1 * | 1/2010 | Hristodorescu | H04N 21/4622 711/E12.083 |
| 2010/0274848 A1 * | 10/2010 | Altmaier | H04L 67/14 709/228 |
| 2011/0131450 A1 * | 6/2011 | Wheeler | G06F 11/3688 714/E11.024 |

(Continued)

OTHER PUBLICATIONS

Declaration of Non-Establishment of International Search Report and Written Opinion from PCT/US2023/022864, dated Sep. 6, 2023, 10 pages.

(Continued)

*Primary Examiner* — Noosha Arjomandi

(57) ABSTRACT

The present disclosure generally relates to capturing multiple types of data during execution of an application, the multiple types of data including data associated with messages published by nodes and metadata corresponding to execution of nodes. The multiple types of data are then stored with associated message identifiers to efficiently capture all data needed for playback. In some examples, such techniques allow for deterministic playback, even when nodes are concurrently operating on different compute systems.

27 Claims, 9 Drawing Sheets

(56) References Cited

U.S. PATENT DOCUMENTS

| | | | | |
|---|---|---|---|---|
| 2015/0285659 | A1* | 10/2015 | Curtis | G01C 22/006 702/97 |
| 2016/0127467 | A1* | 5/2016 | Mu | H04L 67/1097 709/213 |
| 2017/0017678 | A1* | 1/2017 | Agrwal | G06F 16/21 |
| 2017/0090777 | A1* | 3/2017 | Horn | G06F 3/0649 |
| 2018/0343217 | A1* | 11/2018 | Sedan | H04N 21/2353 |
| 2018/0357486 | A1* | 12/2018 | Lau | G06V 20/70 |
| 2019/0068690 | A1* | 2/2019 | Canton | H04L 41/0895 |
| 2019/0332522 | A1* | 10/2019 | Leydon | H04L 65/4015 |
| 2020/0076539 | A1* | 3/2020 | Tang | G06F 16/27 |
| 2020/0213667 | A1* | 7/2020 | Qiang | H04N 21/6582 |
| 2020/0409537 | A1* | 12/2020 | Story | H04L 67/52 |
| 2022/0108125 | A1* | 4/2022 | Dai | G06F 18/285 |
| 2022/0337518 | A1* | 10/2022 | Butler | G06T 11/60 |
| 2022/0377518 | A1* | 11/2022 | Parry | H04N 21/8113 |
| 2023/0035344 | A1* | 2/2023 | White | G06F 16/2322 |
| 2023/0376541 | A1* | 11/2023 | Abdelhadi | G06F 11/362 |
| 2023/0393801 | A1* | 12/2023 | Boule | G06T 13/80 |
| 2023/0418842 | A1* | 12/2023 | Gminder | G06F 16/27 |
| 2024/0001965 | A1* | 1/2024 | Gardner | H04L 67/303 |

OTHER PUBLICATIONS

Apache Flink, +A2:A20ema Evolution, May 2021, retrieved from https://nightlies.apache.org/flink/flink-docs-release-1.13/docs/dev/datastream/fault-tolerance/schema_evolution/.

Atwell, "ROS 2 Explained: Overview and Features," Electronic Design, Jan. 2022, retrieved from https://www.electronicdesign.com/markets/automation/article/21214053/electronic-design-ros-2-explained-overview-and-features.

Blackberry|QNX, "Building the ROS sensor publisher node example," retrieved from https://www.qnx.com/developers/docs/7.0.0/index.html#com.qnx.doc.adas.system_services/topic/javascriptwindow.print(); Jan. 2021.

Blackberry|QNX, "Using ROS," retrieved from https://www.qnx.com/developers/docs/7.0.0/index.html#com.qnx.doc.adas.system_services/topic/ros_using.html, Jan. 2021.

Clearpath Robotics, "Intro to ROS," 2015, retrieved from https://www.clearpathrobotics.com/assets/guides/melodic/ros/Intro%20to%20the%20Robot%20Operating%20System.html.

Hildebrand, "An Architectural Overview of QNX," Proceedings of the Usenix Workshop on Micro-Kernels & Other Kernel Architectures, Apr. 1992, retrieved from https://cseweb.ucsd.edu/~voelker/cse221/papers/qnx-paper92.pdf.

Lerner, "A Model for Compound Type Changes Encountered in Schema Evolution," 2000, retrieved from https://scholarworks.umass.edu/cgi/viewcontent.cgi?article=1041&context=cs_faculty_pubs.

Litt, et al., "Project Cambria," Oct. 2020, retrieved from https://www.inkandswitch.com/cambria/.

Mariani, et al., "A Model for Schema Evolution in Object-Oriented Databased Systems," Oct. 1994, retrieved from https://www.researchgate.net/publication/2245052_A_Model_for_Schema_Evolution_in_Object-Oriented_Database_Systems.

Monk, et al., "Schema Evolution in OODBs Using Class Versioning," Sep. 1993, retrieved from https://www.researchgate.net/publication/220415988_Schema_Evolution_in_OODBs_Using_Class_Versioning/link/53db88b40cf216e4210bf4b7/download.

Qualcomm, "Snapdragon Ride SDK: a premium platform for developing customizable ADAS applications," Jan. 2022, retrieved from https://www.qualcomm.com/news/onq/2022/01/snapdragon-ride-sdk-premium-solution-developing-customizable-adas-and-autonomous.

Quigley, et al., "ROS: an open-source Robot Operating System," 2009, retrieved from http://robotics.stanford.edu/~ang/papers/icraoss09-ROS.pdf.

ROS Discourse, retrieved from https://discourse.ros.org/t/deterministic-replay-and-debugging/1316, Feb. 2017.

ROS/Client Libraries, retrieved from http://wiki.ros.org/Client%20Libraries, last edited Dec. 2020, 2 pages.

ROS/Concepts, retrieved from http://wiki.ros.org/ROS/Concepts, last edited Sep. 2022, 7 pages.

ROS/Higher-Level Concepts, retrieved from http://wiki.ros.org/ROS/Higher-Level%20Concepts, last edited May 2015, 2 pages.

ROS/Introduction, retrieved from http://wiki.ros.org/ROS/Introduction, last edited Aug. 2018, 4 pages.

ROS/rosbag, Package Summary, retrieved from http://wiki.ros.org/rosbag, last edited Jun. 2020, 3 pages.

ROS/Technical Overview, retrieved from http://wiki.ros.org/ROS/Technical%20Overview, last edited Jun. 2014, 5 pages.

ROS/Tutorials/Multiple machines, retrieved from http://wiki.ros.org/ROS/Tutorials/MultipleMachines, last edited Mar. 2019, 3 pages.

ROS/Tutorials/Recording and playing back data, retrieved from http://wiki.ros.org/ROS/Tutorials/Recording%20and%20playing%20back%20data, last edited Jun. 2020, 5 pages.

Ros-Answers, retrieved from https://answers.ros.org/question/254354/deterministic-replay-and-debugging/, last edited Feb. 2017, 2 pages.

Santos, et al., "Static-time Extraction and Analysis of the ROS Computation Graph," 2019, retrieved from http://haslab.github.io/SAFER/irc19.pdf.

Sundmark, "Deterministic Replay Debugging of Embedded Real-Time Systems using Standard Components," Mar. 2004, Thesis, retrieved from https://citeseerx.ist.psu.edu/viewdoc/download?doi=10.1.1.58.9334&rep=rep1&type=pdf.

Sundmark, et al., "Replay Debugging of Complex Real-Time Systems: Experiences from Two Industrial Case Studies," 2003, retrieved from http://www.es.mdh.se/pdf_publications/436.pdf.

Tawil, "An Introduction to Robot Operating System (ROS)," All About Circuits, Jun. 2017, retrieved from https://www.allaboutcircuits.com/technical-articles/an-introduction-to-robot-operating-system-ros/.

Invitation to Pay Additional Fees from PCT/US2023/022866, dated Sep. 8, 2023, 14 pages.

International Search Report and Written Opinion from PCT/US2023/022866, dated Oct. 31, 2023, 20 pages.

\* cited by examiner

PLAYBACK ENGINE

CROSS-REFERENCE TO RELATED APPLICATIONS

The present application claims benefit of U.S. Provisional Patent Application Ser. No. 63/343,943, entitled "PLAYBACK ENGINE" filed on May 19, 2022, which is hereby incorporated by reference in its entirety for all purposes.

BACKGROUND

Execution of an application often requires performing operations very quickly and/or on different compute systems. Capturing execution of such operations for playback is sometimes difficult. Accordingly, there is a need to better capture execution of operations for playback.

SUMMARY

Current techniques for capturing execution of operations for playback are generally ineffective and/or inefficient. For example, current techniques fail to capture the right information and/or fail to use captured information to achieve effective and/or efficient playback (e.g., deterministic playback). The ability to accurately reproduce recorded behavior (expected or unexpected) or simulate different behaviors offline is important for development. Today, many unexpected behaviors require a lot of resources to try to reproduce and debug. In many cases, recorded behaviors cannot be reproduced or understood using existing techniques.

This disclosure provides more effective and/or efficient techniques for capturing the execution. Such techniques optionally complement or replace other methods for capturing execution of operations. In some examples, techniques described herein, by accurately reproducing recorded behaviors or simulating different behavior offline, make development and bug fixing processes more efficient and free up limited hardware resources to be used for other goals. In such examples, this allows for accurate reproduction on different hardware than the one that the execution originally used. In some examples, accurate reproduction may be performed faster than real time. In addition, some techniques are able to re-create intermediate data products offline to allow for testing of events that could not be recorded sometimes due to hardware and memory constraints.

Some techniques described herein cover a system for capturing multiple types of data during execution of an application, the multiple types of data including data associated with messages published by nodes and metadata corresponding to execution of nodes. The multiple types of data are then stored with associated message identifiers to efficiently capture all data needed for playback. In some examples, such techniques allow for deterministic playback, even when nodes are concurrently operating on different compute systems.

The disclosure herein often describes an application represented by a graph with nodes and edges to illustrates techniques. It should be understood that other types of architectures for an application may be used with techniques described herein to improve current techniques.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Figure 1:
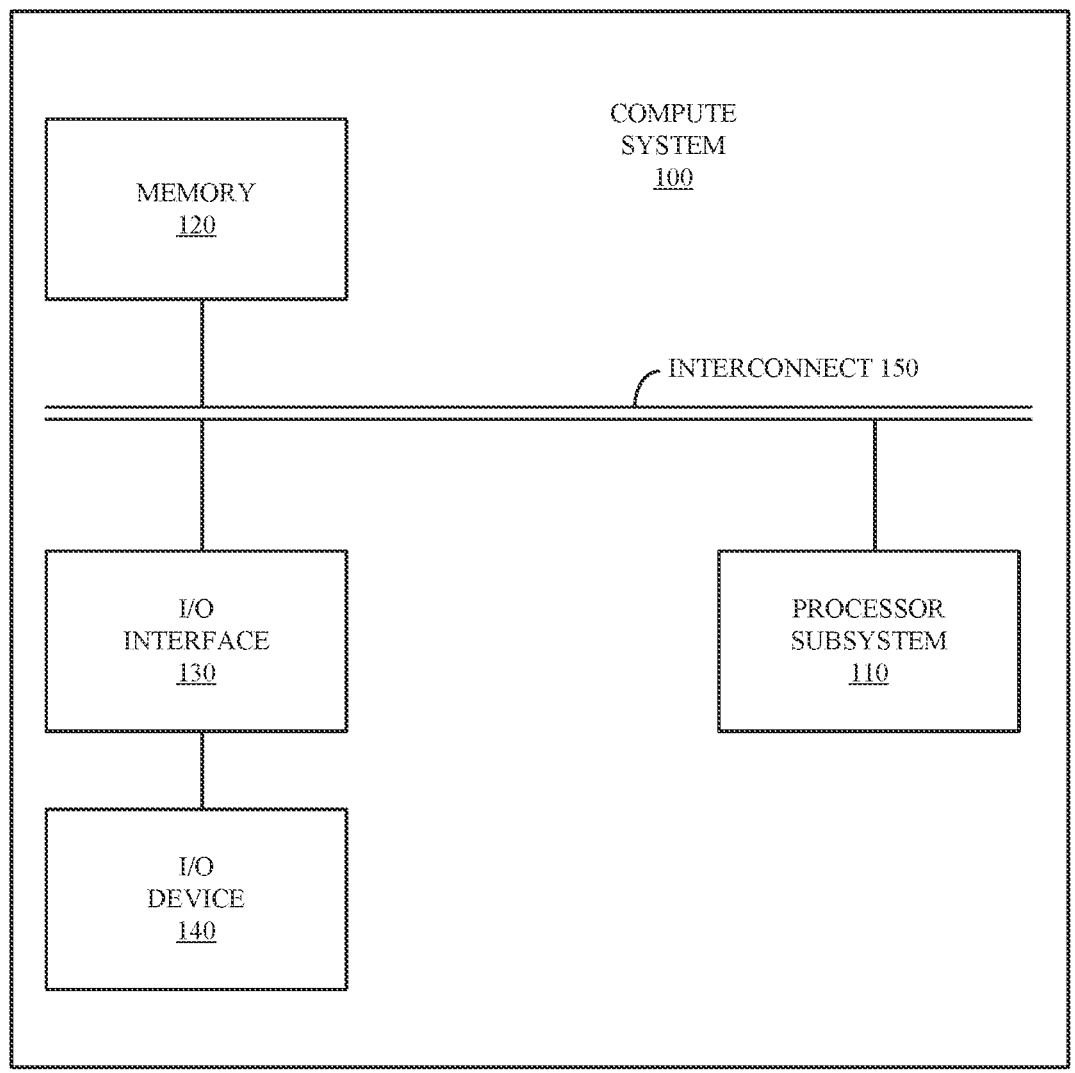
FIG. 1 is a block diagram illustrating a compute system.

The following description sets forth exemplary methods, parameters, and the like. It should be recognized, however, that such description is not intended as a limitation on the scope of the present disclosure but is instead provided as a description of exemplary embodiments.

Some techniques described herein cover capturing multiple types of data during execution of an application, the multiple types of data including data associated with messages published by nodes and metadata corresponding to execution of nodes. In one example, a device includes a recording service that allows playback of one or more operations performed by one or more nodes executing on the device. The recording service receives, via a first channel, a message including an identification of the message, where the first channel corresponds to a subscription to data published by a first node. The recording service also receives, via a second channel, metadata corresponding to execution of a second node, where the metadata includes the identification of the message and timing information about when the message was written and/or read. After receiving the message and the metadata, the recording service outputs data associated with the message and the metadata for execution playback. Such a system minimizes the amount of data that is transmitted while maintaining a link between data received by a node (e.g., the second node) and execution of the node using the data. In some examples, such techniques allow for deterministic playback, even when nodes are concurrently operating on different hardware processors.

In methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. In some examples, these terms are used to distinguish one element from another. For example, a first device could be termed a second device, and, similarly, a second device could be termed a first device, without departing from the scope of the various described embodiments. In some examples, the first device and the second device are two separate references to the same device. In some embodiments, the first device and the second device are both devices, but they are not the same device or the same type of device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Turning now to FIG. 1, a block diagram of compute system 100 is depicted. Compute system 100 is a non-limiting example of a compute system that may be used to perform functionality described herein. It should be recognized that other computer architectures of a compute system may be used to perform functionality described herein.

In the illustrated example, compute system 100 includes processor subsystem 110 coupled (e.g., wired or wirelessly) to memory 120 (e.g., a system memory) and I/O interface 130 via interconnect 150 (e.g., a system bus, one or more memory locations, or other communication channel for connecting multiple components of compute system 100). In addition, I/O interface 130 is coupled (e.g., wired or wirelessly) to I/O device 140. In some examples, I/O interface 130 is included with I/O device 140 such that the two are a single component. It should be recognized that there may be one or more I/O interfaces, with each I/O interface coupled to one or more I/O devices. In some examples, multiple instances of processor subsystem 110 may be coupled to interconnect 150.

Compute system 100 may be any of various types of devices, including, but not limited to, a system on a chip, a server system, a personal computer system (e.g., an iPhone, iPad, or MacBook), a sensor, or the like. In some examples, compute system 100 is included with or coupled to a physical component for the purpose of modifying the physical component in response to an instruction (e.g., compute system 100 receives an instruction to modify a physical component and, in response to the instruction, causes the physical component to be modified (e.g., through an actuator)). Examples of such physical components include an acceleration control, a break, a gear box, a motor, a pump, a refrigeration system, a suspension system, a steering control, a vacuum system, and a valve. As used herein, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. Although a single compute system is shown in FIG. 1, compute system 100 may also be implemented as two or more compute systems operating together.

In some examples, processor subsystem 110 includes one or more processors or processing units configured to execute program instructions to perform functionality described herein. For example, processor subsystem 110 may execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that are to be executed by processor subsystem 110. In such examples, the priority assigned to a task is used to identify a next task to execute. In some examples, the priority-based scheduler identifies a next task to execute when a previous task finishes executing (e.g., the highest priority task runs to completion unless another higher priority task is made ready).

In some examples, the middleware system provides one or more services and/or capabilities to applications (e.g., the one or more applications running on processor subsystem 110) outside of what is offered by the operating system (e.g., data management, application services, messaging, authentication, API management, or the like). In some examples, the middleware system is designed for a heterogeneous computer cluster, to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that may receive, post, and multiplex sensor data, control, state, planning, actuator, and other messages. In such examples, an application (e.g., an application executing on processor subsystem 110 as described above) may be defined using the graph architecture such that different operations of the application are included with different nodes in the graph architecture.

In some examples, a message sent from a first node in a graph architecture to a second node in the graph architecture is performed using a publish-subscribe model, where the first node publishes data on a channel in which the second node is able to subscribe. In such examples, the first node may store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 may include a computer readable medium (e.g., non-transitory or transitory computer readable medium) usable to store program instructions executable by processor subsystem 110 to cause compute system 100 to perform various operations described herein. For example, memory 120 may store program instructions to implement the functionality associated with the flow described in FIGS. 4 and/or 5.

Memory 120 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Rather, compute system 100 may also include other forms of storage such as cache memory in processor subsystem 110 and secondary storage on I/O device 140 (e.g., a hard drive, storage array, etc.). In some examples, these other forms of storage may also store program instructions executable by processor subsystem 110 to perform operations described herein. In some examples, processor subsystem 110 (or each processor within processor subsystem 110) contains a cache or other form of on-board memory.

I/O interface 130 may be any of various types of interfaces configured to couple to and communicate with other devices. In some examples, I/O interface 130 includes a bridge chip (e.g., Southbridge) from a front-side bus to one or more back-side buses. I/O interface 130 may be coupled to one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some examples, compute system 100 is coupled to a network via a network interface device (e.g., configured to communicate over Wi-Fi, Bluetooth, Ethernet, or the like).

Figure 2:
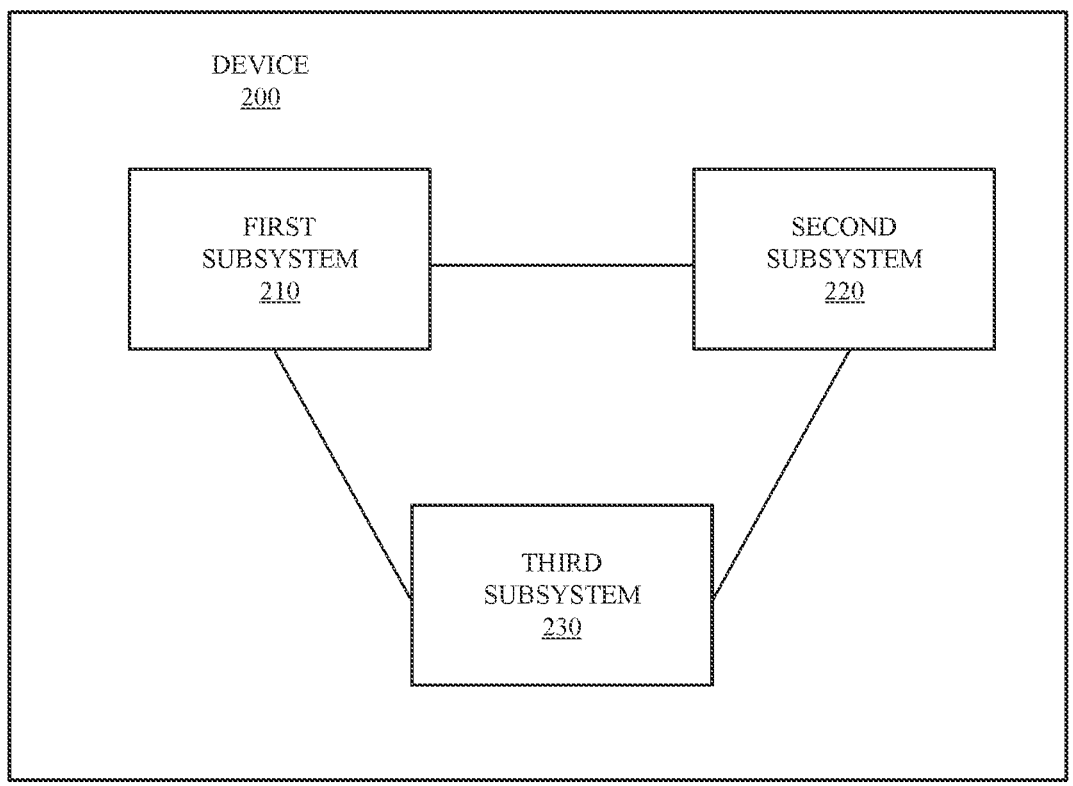
FIG. 2 is a block diagram illustrating a device with interconnected subsystems.

FIG. 2 depicts a block diagram of device 200 with interconnected subsystems. In the illustrated example, device 200 includes three different subsystems (i.e., first subsystem 210, second subsystem 220, and third subsystem 230) coupled (e.g., wired or wirelessly) to each other. An example of a possible computer architecture of a subsystem as included in FIG. 2 is described in FIG. 1 (i.e., compute system 100). Although three subsystems are shown in FIG. 2, device 200 may include more or fewer subsystems.

In some examples, some subsystems are not connected to another subsystem (e.g., first subsystem 210 may be connected to second subsystem 220 and third subsystem 230 but second subsystem 220 may not be connected to third subsystem 230). In some examples, some subsystems are connected via one or more wires while other subsystems are wirelessly connected. In some examples, one or more subsystems are wirelessly connected to one or more compute systems outside of device 200, such as a server system. In such examples, the subsystem may be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate device 200 (with or without direct user input) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 may each be a camera that is capturing images for third subsystem 230 to use to make a decision. In some examples, at least a portion of device 200 functions as a distributed compute system. For example, a task may be split into different portions, where a first portion is executed by first subsystem 210 and a second portion is executed by second subsystem 220.

Attention is now directed towards techniques for capturing execution of operations for playback using an example of a graph application. The graph application uses a graph to model at least a portion of a software application. The graph includes nodes to represent one or more operations and edges to represent channels for data to be sent between different nodes. It should be understood that other types of architectures for a software application are within scope of this disclosure and may benefit from techniques described herein. For example, an object oriented architecture with different objects communicating with each other may be used for capturing execution of operations.

As used herein, source code (sometimes referred to as assembly, uncompiled, or programming code) includes code written by a programmer (sometimes referred to as a developer) using a programming language which is comprehensible to appropriately trained persons and is not capable of directly being used to give one or more instructions to a processor. As used herein, object code (sometimes referred to as executable code) includes machine code (e.g., code readable by a processor when loaded into memory and used directly by the processor to execute one or more instructions) and/or byte code (e.g., code readable by an interpreter during runtime and used by the interpreter to execute one or more instructions by a processor). As used herein, compile time is the time at which source code is converted into object code. In some examples, such conversion may be performed by a compiler and/or an assembler. As used herein, runtime is the time at which one or more instructions of object code are executing by a processor. In some examples, such execution may be performed by a program loader in response to a request to execute the object code. As used herein, a process is an instance of a computer program that is being executed by an operating system on one or more processors. As used herein, a node is an abstraction for one or more operations (e.g., software instructions) of a graph application. As used herein, an edge is an abstraction for sending and/or receiving data by a node. In some examples, an edge is a channel for which data is sent and/or received by a node, the channel used for sending and/or receiving data at different times. As used herein, "sending" data from one node to another node may refer to either actually sending the data to the other node or storing the data such that the other node may access the data (such as through a publication and subscription model). An example of actually sending the data to the other node includes addressing a message including the data to the other node. An example of storing the data includes notifying the other node that the data has been stored (and optionally notifying where the data has been stored through, for example, a pointer to a memory location) and the other node accessing the data where it has been stored. In another example, storing the data may not include notifying the other node that the data has been stored and instead the other node requests (e.g., at a fixed or variable rate) to access a known location for the data.

Figure 3:
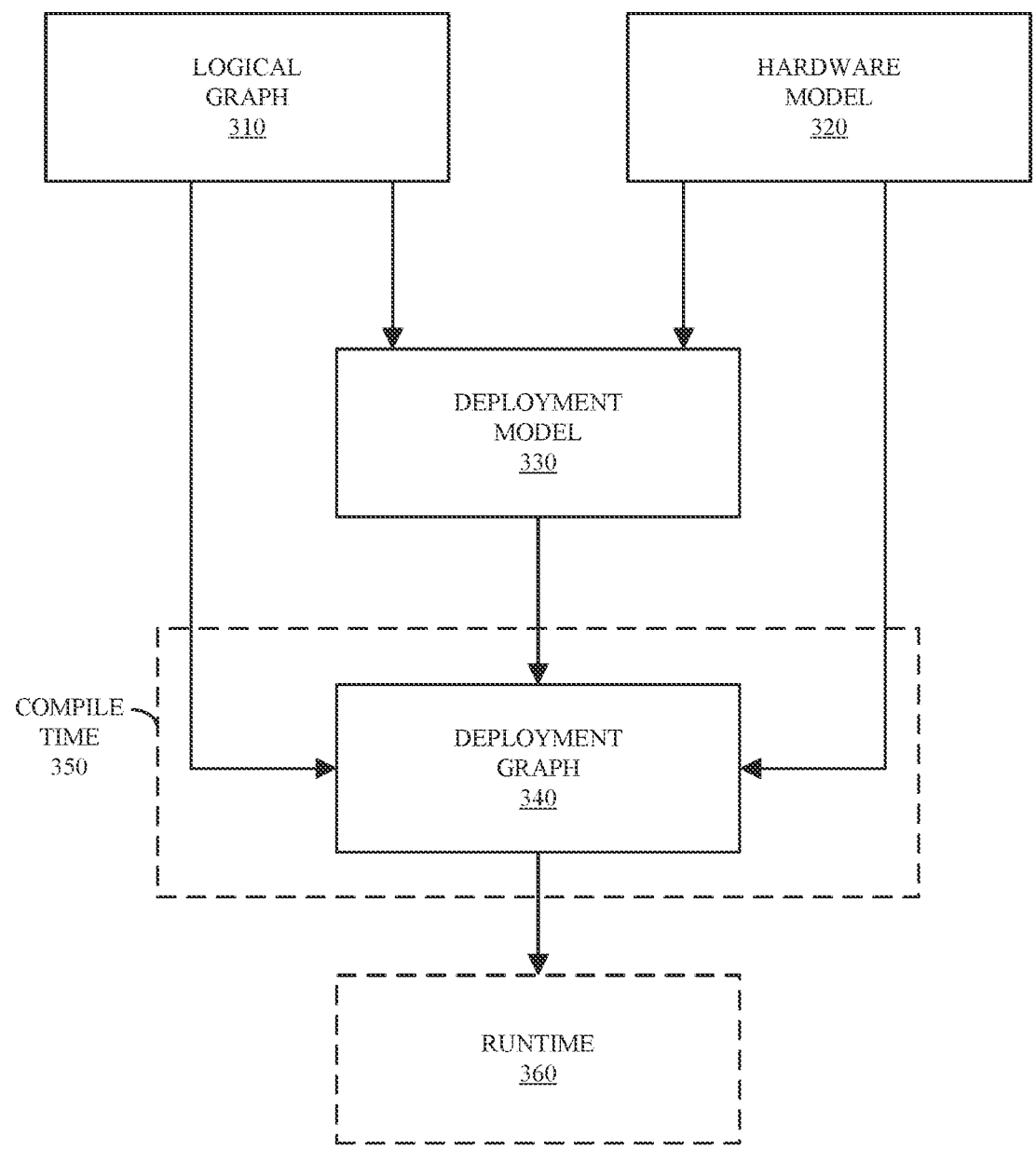
FIG. 3 is a block diagram illustrating different components of a graph application.

FIG. 3 is a block diagram illustrating different components of a graph application. The different components of the graph application include logical graph 310, hardware model 320, deployment model 330, and deployment graph 340. As further discussed below, logical graph 310 describes what the graph application is doing, hardware model 320 describes information about different compute systems, deployment model 330 assigns particular operations of the graph application to compute systems (or components of compute systems), and deployment graph 340 indicates the execution architecture of the graph application.

In some examples, source code of the graph application includes logical graph 310 and, optionally, hardware model 320, deployment model 330, or any combination thereof. For example, the source code may only include logical graph 310. In such an example, hardware model and/or deployment model 330 may be generated during compile time based on logical graph 310. For another example, the source code may include logical graph 310 and deployment model 330. In such an example, deployment graph 340 may be generated during compile time based on logical graph 310 and deployment model 330. It should be recognized that the graph application may include more or fewer components, including the combination of some components described herein.

As mentioned above, logical graph 310 describes what the graph application is doing. In some examples, logical graph 310 includes at least one node (each node representing one or more operations of the graph application) and zero or more edges (each edge connecting to at least one node representing data being sent or received by the node). For example, logical graph 310 may include a first node that is connected to a second node via an edge directed toward the second node, indicating that the first node is configured to send data to the second node.

As illustrated in FIG. 3, logical graph 310 is an input to deployment model 330 and deployment graph 340. This indicates that deployment model 330 and deployment graph 340 may use information from logical graph 310. It should be recognized that logical graph 310 may be an input to deployment model 330 and not deployment graph 340.

In some examples, logical graph 310 is included in source code, before compile time. An example of source code for a logical graph with two camera nodes that are connected to a detector node is shown in the next 5 paragraphs.

```
Camera c1;
Camera c2;
Detector d1;
c1.output -> d1.c1_input;
c2.output -> d1.c2_input;
```

The source code above includes two instantiations of a camera node (i.e., c1 and c2). The instantiations point to source code that define one or more operations of the camera node, such as an operation to capture an image and an operation to send the image to another node. The source code above also includes an instantiation of a detector node (i.e., d1). In some examples, the detector node corresponds to one or more operations associated with detecting a feature in a pair of images, such as an operation to receive an image from a camera node and an operation to determine differences between images. The source code above also uses interfaces of the nodes to indicate how the nodes are connected to each other through edges. In particular, both c1 and c2 include a respective "output" interface, and d1 includes a "c1_input" interface and a "c2_input" interface. The interfaces are then connected to each other to create an edge using an arrow (i.e., "->"). For example, "c1.output->d1.c1_input" corresponds to the "output" interface of c1 sending data to the "c1_input interface" of d1.

Referring back to FIG. 3, the block diagram includes hardware model 320. As mentioned above, hardware model 320 describes information about different compute systems. In some examples, such information includes a definition for each subsystem (e.g., first subsystem 210) in a device (e.g., device 200). Examples of information in a definition include a number of processors within a processor subsystem (e.g., processor subsystem 110), a number of processor subsystems within a compute system (e.g., compute system 100), different types of memory associated with a compute system (e.g., memory 120 or memory of processor subsystem 110), an amount of different types of memory associated with a compute system, different types of I/O devices (e.g., I/O device 140) within a compute system, different I/O interfaces (e.g., I/O interface 130) within a compute system, a number of subsystems within a device (e.g., device 200), identifying information of any component described in this list (e.g., a universally unique identifier (UUID), a media access control (MAC) address, or an Internet Protocol (IP) address), an identification of a particular interrupt (e.g., a software or hardware interrupt), and any other information related to a hardware component.

In some examples, hardware model 320 is included in source code, before compile time, based on an understanding of a system for which the graph application will be deployed. In other examples, hardware model 320 is automatically (e.g., without a programmer manually adding hardware model 320 to the source code) included, either before or while compiling, in the source code by a process based on an analysis of the system for which the graph application will be deployed. For example, the process may query the system to identify information about the system to add to a hardware model.

An example of source code defining a hardware model is shown in the next 17 paragraphs.

```
<node identifier="cpu_0" type="cpu">
... <parameter name="net_0" type="mac" value ="00:00:5e:00:53:af"/>
... <parameter name="net_0" type="ipv4" value ="192.158.1.38"/>
... <parameter name="l1_0" type="l1" value ="256 KB"/>
</node>
<node identifier="cpu_1" type="cpu">
... <parameter name="net_0" type="mac" value ="00:00:5e:00:53:ag"/>
... <parameter name="net_0" type="ipv4" value ="192.158.1.40"/>
</node>
<node identifier="ss_1" type="subsystem">
... <parameter name="l2_0" type="l2" value ="2 MB"/>
... <parameter name="ram_0" type="ram" value ="2 GB"/>
... <parameter name="rom_0" type="rom" value ="1 TB"/>
... <parameter name="cpu_0" type="cpu"/>
... <parameter name="cpu_1" type="cpu"/>
... <parameter name="bt_0" type="io" value ="bluetooth"/>
</node>
```

The source code defining the hardware model above includes two processors (i.e., cpu_0 and cpu_1) that are included in a subsystem (i.e., ss_1). Both processors each include two identifiers: a MAC address and an IP address. It should be recognized that one or more of the processors might include more or fewer identifiers. cpu_0 also includes memory in the form of L1 cache (i.e., l1_0). cpu_1 does not include any memory, indicating that cpu_1 does not have access to the L1 cache of cpu_0 ss1 includes identifiers to both CPUs that are included with the subsystem (i.e., cpu_0 and cpu_1). ss1 also includes three different types of memory, including L2 cache (i.e., l2_0), random access memory (i.e., ram_0), and non-volatile memory (i.e., rom_0). By ss1 including the different types of memory, the source code indicates that both processors have access to all three different types of memory, unlike with respect to the L1 cache of cpu_0. ss_1 also includes one I/O device in the form of a Bluetooth radio (i.e., bt_0).

Similar to logical graph 310, hardware model 320 is depicted as an input to deployment model 330 and deployment graph 340. This indicates that deployment model 330 and deployment graph 340 may use information from hardware model 320. It should be recognized that hardware model 320 may be an input to deployment model 330 and not deployment graph 340.

As mentioned above, deployment model 330 assigns particular operations of the graph application to compute systems (or components of compute systems). Such assignments refer to establishing that particular compute systems will execute particular operations. In some examples, deployment model 330 includes assignments of nodes from logical graph 310 to compute systems from hardware model 320. For example, a node may represent an operation and be assigned to a compute system such that the compute system should execute the operation rather than a different compute system, allowing to plan where different operations are executing before execution.

In some examples, deployment model 330 further assigns data to be stored in particular memory locations, such as data being sent for an edge. Such assignments may refer to establishing that a node will store data (1) at a particular location so that other nodes may know where to access the data or (2) on a different subsystem from where the node is executing so that the data is located on a subsystem for which it will be used for a calculation or determination.

In some examples, deployment model 330 defines one or more bridges for communicating outside of a compute system. For example, a bridge may be added to each compute system sending to or receiving from outside of the compute system. In such an example, a bridge on a first compute system receives data from a first node to send to a second node on another compute system. In some examples, the bridge packages the data in a particular format for transmission between the compute systems. The bridge then sends the packaged data to a bridge on the other compute system so that the bridge on the other compute system may send the data to the second node. For another example, a bridge may be added to a single compute system that handles sending data from the compute system directly to a node on another compute system, without going through a bridge on the other compute system.

In some examples, a bridge is defined for a compute system when there is an edge between the compute system and another compute system. Such bridges are often included with deployment model 330 before compiling when there are one or more constraints for the bridge that would not be identifiable by logic graph 310, hardware model 320, deployment model 330, or any combination thereof. For example, a node for which a bridge is needed may not be included in logic graph 310, hardware model 320, or deployment model 330. In such an example, the bridge may not be generated when deployment graph 340 is generated and would need to be included beforehand, such as in the source code that is being compiled. In some examples, different types of bridges that send data using particular protocols may be added to deployment model 330, such as bridges sending data according to Transmission Control Protocol (TCP), User Datagram Protocol (UDP), or Controller Area Network (CAN).

In some examples, deployment model 330 is included in source code, before compile time, based on an understanding of a system for which the graph application will be deployed. In other examples, deployment model 330 is automatically (e.g., without a programmer manually adding deployment model 330 to the source code) included, either before or while compiling, in the source code by a software program based on an analysis of logical graph 310 and hardware model 320. In some examples, deployment model 330 includes information from hardware model 320 such that the source code does not include hardware model 320. An example of source code for a deployment model is shown in next 27 paragraphs.

```
process p1 {
... node c1
... node c2
... attrib cpu="cpu_0"
}
```

```
edge e1 {
... name ="c1.input"
... resource_type = "registry"
}
edge e2 {
... name ="c1.output"
... location = "l1_0 0"
... resource_type ="rw_shared_memory"
}
edge e3 {
... name = "c2.output"
... location ="l1_0 1"
... resource_type = "rw_shared_memory"
}
process p2 {
... node d1
... attrib cpu="cpu_1"
}
  bridges b{
  ... edge c1.output -> bridge_c1_to_d1;
  ... edge bridge_c1_to_d1 -> d1.c1_input;
  ... edge c2.output -> bridge_c2_to_d1;
  ... edge bridge_c2_to_d1 -> d1.c2_input;
  }
```

The source code for the deployment model above indicates a single process to be created on each CPU (i.e., cpu_0 and cpu_1). In some examples, a process includes multiple threads of execution that execute instructions concurrently. While the source code only includes a single process on each CPU, it should be recognized that more processes may be executing on a single CPU. The source code also indicates that the camera nodes (i.e., c1 and c2) are to be executed on a first process (i.e., p1) and the detector node (i.e., d1) are to be executed on a second process (i.e., p2). The source code also defines that the input of c1 will be stored in a read-only shared resource (i.e., edge e1), the output of c1 at c1.output will be stored in read-write shared memory at the 0 location of the L1 cache (i.e., edge e2), and the output of c2 at c2.output will be stored in read-write shared memory at the 1 location of the L1 cache (i.e., edge e3). It should be recognized that other resource types may be used for edges, such as local memory, write-only memory, read-only memory, or the like. The code above does not define where other data will be stored, indicating that the compiler, one or more processors, and/or operating system associated with c1, c2, and d1 may choose where to store data. It should be recognized that c1.input, c1.output, and c2.output may not be defined where the data will be stored such that the compiler, one or more processors, and/or operating system associated with c1 and c2 may choose where to store the outputs.

As illustrated in FIG. 3, deployment model 330 is an input to deployment graph 340. This indicates that deployment graph 340 may use information from deployment model 330.

As mentioned above, deployment graph 340 indicates the execution architecture of the graph application. In some examples, deployment graph 340 includes one or more nodes, each node representing one or more operations performed during execution of the graph application, and zero or more edges, each edge representing a channel for data to be sent between different nodes. As depicted, deployment graph 340 is generated using logical graph 310, hardware model 320, and deployment model 330. It should be recognized that deployment graph 340 may be generated using some other combination of components (e.g., logical graph 310 and hardware model 320, logical graph 320 and deployment model 330, or just deployment model 330).

In some examples, deployment graph 340 indicates assignments of nodes to compute systems (e.g., compute system 100) and is used during runtime when executing the graph application to ensure nodes are executed on proper compute systems. In some examples, deployment graph 340 includes additional components that were not defined for the graph application before compiling, such components facilitating execution of the graph application on the proper compute systems. Examples of such additional components include instruction sets corresponding to different compute systems, code to check information about a particular compute system, bridges between different compute systems, timer nodes, recording services, and additional edges to facilitate other additional components.

In some examples, deployment graph 340 includes object code that is executable by a compute system (e.g., compute system 100), either directly by a processor subsystem (e.g., processor subsystem 110) or through an interpreter during runtime. In such examples, the deployment graph 340 may include executable code that is configured to require particular nodes to be executed by particular compute systems. Operations corresponding to such executable code may have not been defined before compiling, such that there was no requirement that particular nodes be executed by particular compute systems before compiling.

In some examples, the executable code requires such execution by using an instruction set specific to a particular compute system. In such examples, generating deployment graph 340 includes, for each compute system, identifying an instruction set for the compute system, identifying one or more nodes to be executed by the compute system, and generating executable code (e.g., byte, machine, or object code) according to the instruction set for the one or more nodes.

In other examples, the executable code requires such execution by including executable code to check one or more characteristics of a compute system that the executable code is executing. The one or more characteristics may include any information included in hardware model 310, such as identifying information associated with the compute system, a particular type of I/O device, or a particular amount of memory accessible by the compute system. In some examples, the executable code to check the one or more characteristics may perform the check and only continue to execute code associated with different nodes when the check is successful.

In some examples, one or more bridges are generated for deployment graph 340 while compiling the graph application. Such generation may be performed for an edge when information is known with respect to compute systems on both sides of the edge, such as an incoming and outgoing format of data. Similar to as described above with respect to deployment model 330, a bridge may be added to each compute system sending to or receiving from outside of the compute system. In such an example, a bridge on a first compute system receives data from a first node to send to a second node on another compute system. In some examples, the bridge packages the data in a particular format for transmission between the compute systems. The bridge then sends the packaged data to a bridge on the other compute system so that the bridge on the other compute system may send the data to the second node. For another example, a bridge may be added to a single compute system that handles sending data from the compute system directly to a node on another compute system, without going through a bridge on the other compute system.

In some examples, different types of bridges are automatically added between different nodes based on capabilities of each compute system. For example, it may be determined that a pair of compute systems, or a particular operation, supports a particular type of bridge and that type of bridge should be used, such as bridges sending data according to Transmission Control Protocol (TCP), User Datagram Protocol (UDP), or Controller Area Network (CAN).

In some examples, one or more timer nodes are generated for deployment graph 340 while compiling the graph application. Such generation may be performed for a node when the node requires a current time during operation (e.g., code associated with the node includes an indication that time is needed by the node during execution). For example, a node may include an operation that captures an image and sends the image with a timestamp of when the image was captured. Instead of the node calling a function to receive a current time from an operating system or compute system, the node will receive a current time (e.g., an activation or scheduled time) at execution from a timer node and use the received time as the timestamp. Such generation may also be performed for a node when the node is required to operate at some time interval (e.g., code associated with the node includes an indication that the node should be executed at some time interval). For example, a node may include an operation that executes every 5 seconds. In such an example, a timer node may be added to begin execution of the node every 5 seconds, providing the node a time corresponding to (e.g., an activation or scheduled time) when 5 seconds would have passed even if there was some time required to begin the execution and a current time is after the time corresponding to when 5 seconds would have passed.

In some examples, the time provided to a node is different from a time provided by a hardware component of a compute system. For example, the compute system may include a hardware component that keeps time for the compute system. The hardware component may provide a current time to a process managing time for the graph application, such as in response to a request by the process for the current time. The process may then use time provided by the hardware component to determine when to provide messages with a current time to nodes of the graph application. In some examples, the process manages a global graph-level clock that all nodes in a graph (e.g., a timer node) read current time from. The goal of the global graph-level clock is to abstract the hardware/platform time in order to allow, in some examples, for time to be simulated and/or achieve determinism and reproducibility regardless where playback runs. When executing offline, the process manages the global graph-level clock and simulates time for all nodes in the graph during playback and simulation using it. The process may then use time provided by the hardware component to determine when to provide messages with a current time to nodes of the graph application.

In some examples, the hardware component keeping time for the compute system is synchronized with hardware components of one or more other compute systems that are included in a system executing the graph application. In such examples, synchronized time may allow for reproducible playback by providing a single clock for captured events. Such synchronization may occur according to any known time synchronization mechanism (e.g., clock-sampling mutual network synchronization, Network Time Protocol (NTP), or Precision Time Protocol (PTP)) in response to execution of a graph application, boot up of a compute system, or a compute system connects (or reconnects) to a network (e.g., a physical network, such as ethernet) including another compute system, a compute system joins or rejoins the system.

In some examples, one or more recording services are generated for deployment graph 340 while compiling the graph application. Such generation may cause a recording service to be added to a compute system during runtime 360 (e.g., after compiling or executing the graph application). In some examples, the recording service is added to a compute system that is not executing a node of the graph application. In other examples, the recording service is added to a compute system executing a node of the graph application. In other examples, a recording service is added to each compute system that is executing a node of the graph application. In such examples, a recording service on a compute system may not be aware of another recording service on another compute system. Instead, each recording service may only be aware of what occurs on their respective compute system.

In some examples, a recording service on a compute system is configured to receive data sent on edges originating on the compute system. For example, there may be an edge added to connect every edge originating on the compute system to the recording service. In some examples, the added edges for existing edges are generally recording content of data sent along the edges. In addition to edges added for existing edges, edges may also be added between each node on the compute system to the recording service. In some examples, the added edges for nodes are generally recording metadata about data sent on edges and execution of nodes. The added edges for existing edges and/or for nodes may be optional for some nodes or edges, such as when the recording service is configured to not record data for the nodes or edges. Data may not be recorded to reduce overhead in a system by reducing the number of recording channels or data being recorded in the system, for example, when particular nodes or edges are not needed for playback or it is determined to re-create such data offline. To illustrate, a simple graph includes two nodes connected together: A and B; [A]→[B]. As node A is publishing data, content of the data is recorded via an edge added to the edge between A and B while the metadata about node A is recorded via an edge added to node A. The recording of the content of the data from node A to node B may not be needed if only node A is being played back or both nodes A and B together. However, the recording of the content of the data from node A to node B is needed if playing back node B without playing back node A.

In some examples, a recording service sends received data to an ingestion process to gather data from different compute systems together. In other examples, a recording service temporarily stores (e.g., in local storage or a buffer, such as a ring buffer) received data and does not send to an ingestion process until the recording service determines that the received data should be maintained. When the recording service determines that the received data should be maintained, the recording service may send the received data to the ingestion process. In some examples, the determination to send the received data to the ingestion process is based on whether the recording service (or another process) determines that an event occurred that needs to be recorded. In such examples, different types of events may cause the recording service to send different amounts of data to the ingestion process. For examples, a first type of event may cause the recording service to send data corresponding to the last 5 minutes to the recording service while a second type of event may cause the recording service to send data corresponding to the last 10 minutes.

In some examples, the ingestion process is executing on a compute system that is not executing a node of the graph application. In some examples, the ingestion process receives data from each recording service associated with the graph application. In such examples, the ingestion process creates a package of the data for further processing, such as for playback. The package may include data sent to different nodes (e.g., obtained by a recording service and sent to the ingestion process) and metadata corresponding to execution of the nodes (e.g., sent to a recording service and further sent to the ingestion process).

In some examples, the package is used to playback execution of at least a portion of the graph application, such as to simulate a previous execution for purposes of training a model, viewing what occurred, debugging an issue, or any other purpose that requires re-executing operations (e.g., generating intermediate data that was not recorded originally due to hardware constraints). In some examples, observed activities in the package (including time) are abstracted to be events. For example, data being stored, triggers being sent/received, nodes executing, and time are all made into events that are processed in time order during playback. In such an example, time is simulated, such as by using a timer node to send the simulated time to nodes. In some examples, this allows for deterministic playback regardless of where the playback is running (on the same or different hardware than the events were recorded using). In such examples, because time is simulated, playback may run faster than real time. The timer nodes may be managed by a process using a global clock that ensures all nodes receive current simulated times and timer nodes on different compute systems are synchronized. In some examples, the process using the global clock determines a current simulated time based on graph events and sends all timer nodes in the graph the current simulated time for sending to other nodes. In such examples, the process may schedule timer nodes to execute and send a current simulated time to different nodes to activate the respective nodes. By using simulated time to create a simulated timeline of graph events, different execution models and/or scenarios that were not necessarily recorded are able to be executed by adding (e.g., synthetically generated events), changing, and/or removing graph events.

In some examples, where the ingestion process receives data from one or more recording services without the recording services determining that an event occurred, the ingestion process may determine whether the event occurred before packaging the data for further processing. In such examples, the ingestion process may temporarily store the data in a buffer (e.g., a ring buffer) until a threshold time elapses or a decision is made to maintain the data. Similar to above, the ingestion process may store different amounts of data based on a type of event detected.

In some examples, a list of nodes and/or edges associated with a recording service is provided to a process during execution of the graph application. The process is then configured to establish channels to have data associated with the nodes and/or edges sent to the recording service. In some examples, the same process or another process is configured during execution to create an identifier (e.g., a universally unique identifier (UUID)) for execution of the graph application and provide the identifier to each recording service. In such examples, the identifier is used by each recording service to record data received so as to associate the data with a particular execution of the graph application. In this way, multiple graph applications may be executing at the same time and storing data with different identifiers to differentiate between different graph applications.

In some examples, a recording service is configured to obtain data related to execution of the graph application. The data may be used for playback of the execution of the graph application on the same or different set of compute systems. In some examples, the data is received by the recording service in a message that also includes a timestamp (e.g., the time when an event occurred) and an identity of an event (e.g., an identifier of an edge or an operation that generated the event). An example of a timestamp includes a current time as tracked by a hardware component of a compute system rather than a time received from a timer node. This means that the recording service will be receiving a time that is potentially different from a time that a node is using to operate (i.e., the time received from the timer node). Another example of a timestamp includes a time received from a timer node.

Examples of data obtained by a recording service include (1) any data stored, accessed, and/or received by a node of the graph application and (2) metadata (sometimes referred to as execution metadata) indicating state and/or operations occurring on a node of the graph application during execution. In some examples, the metadata is used to restore the state of a node at any arbitrary time during playback. In such examples, the node outputs a persisted state message that includes information needed to restore its state. The persisted state message is written to a data edge, which is captured via a data channel of the recording service. In some examples, the node can be triggered to output the persisted state message at some time interval using the timer node. The persisted state message is then used offline by a process to restore the node state if playback was requested to start at an arbitrary time of the package.

In some examples, a recording service receives data stored, accessed, and/or received by a node of the graph application by subscribing to edges included in the graph application. For example, a node of the graph application may be subscribed to receive data from another node in the graph application. In such an example, the recording service may subscribe to receive the same data from the other node. In some examples, such a subscription may require the other node to send the data to both the node and the recording service. In other examples, such a subscription may require the other node to send a notification to both the node and recording service so that each of the node and the recording service may independently access the data based on information provided in the notification. In such examples, the message received by the recording service may include (1) a location within memory to access the data or (2) an identifier used to identify a channel and an identifier used to identify a specific message.

In some examples, a recording service receives metadata from a node by subscribing to a node in the graph application. In such examples, a process associated with the graph application (e.g., other than the recording service) identifies nodes executing on a compute system and establishes a single metadata channel from each node to the recording service. A metadata channel may be configured to send data related to execution of a respective node to the recording service.

An example of metadata includes a node launch event. The node launch event indicates that a respective node has been initiated (sometimes referred to as launched) and is executing on a compute system. In some examples, the node launch event is sent (1) when the node begins executing for the first time, (2) when the node has been restarted, (3) or any combination thereof. The node launch event allows for playback to identify when to launch a node.

Another example of metadata includes a trigger event. The trigger event indicates when a trigger (sometimes referred to as a notification) has been sent or received by a node. In some examples, the trigger event is sent (1) when a sending node (e.g., a timer node or a node executing one or more operations of the graph application) sends one or more triggers to one or more receiving nodes, (2) when a receiving node is executing and acknowledges that the receiving node has received a trigger from a sending node (e.g., a timer node or a node executing one or more operations of the graph application), (3) when a receiving node transitions from a sleep mode to an active mode and acknowledges that the receiving node has received one or more triggers from one or more sending nodes (e.g., a timer node or a node executing one or more operations of the graph application) (in some examples, there is a different trigger event for each sending node), or (4) any combination thereof. In some examples, the trigger event includes a number of triggers sent and/or received. For example, a sending node may publish three different messages to one or more subscribers of a data channel, and the sending node will send a trigger event with count of three indicating that three different messages are available on that data channel. For another example, a receiving node may begin executing and have received three triggers since the receiving node last executed or checked whether the receiving node has received a trigger. In such an example, receiving node will send a trigger event indicating a count of three triggers have been received. The trigger event allows for playback to identify communications that are sent across different nodes during execution.

Another example of metadata includes a data range event. The data range event indicates an amount or range of data that is available for a node to read. In some examples, the data range event is sent when a node is about to execute an operation that operates on data (e.g., in response to determining to execute an operation based on the data). The data range event allows for playback to identify a state known by a node with respect to data that needs to be read when the node begins execution.

Another example of metadata includes a read event. The read event indicates that a node has initiated or finished reading data. In some examples, the read event is sent when a node executes a command to read or when the node receives an indication that a read has finished. In some examples, the read event does not include the data being read. Instead, the read event includes an indication of (1) an identifier used to identify an edge and a memory location corresponding to the data being read, (2) an identifier used to identify an edge and an identifier used to identify a specific message (e.g., a message including the data or a message sending the read request), (3) a message including the data, or (4) any combination thereof. The indication can then be used to obtain the data at a later time to be used for playback. In some examples, the read event includes an indication of a status of the read, such as that the read has been initiated or that the read was successful or unsuccessful. The read event allows for playback to identify when and what to read without having to include the data being read at the time of sending the read event.

Another example of metadata includes a write event. The write event indicates that a node has initiated or finished writing data. In some examples, the write event is sent when a node executes a command to write or when the node receives an indication that a write has finished. In some examples, the write event does not include the data being written. Instead, the write event includes an indication of (1) an identifier used to identify an edge and a memory location corresponding to the data, (2) an identifier used to identify an edge and an identifier used to identify a specific message (e.g., a message including the data or a message sending the write request), (3) a message including the data, or (4) any combination thereof. The indication can then be used to obtain the data at a later time to be used for playback. In some examples, the write event also includes an indication of a status of the write, such as that the write has been initiated or that the write was successful or unsuccessful. The write event allows for playback to identify when and what to write without having to include the data being written at the time of sending the write event.

Another example of metadata includes a function event. The function event indicates that a function (sometimes referred to as an operation) has initiated or finished execution. In some examples, the function event is sent (1) each time an operation is executed, (2) when an indication is received that the operation has finished executing, (3) when a subsequent operation begins executing, indicating that the operation has finished executing, or (4) any combination thereof. The function event allows for playback to identify when to launch an operation and/or when to wait for a certain operation to terminate before processing the next event and advancing simulated time. For example, a function event indicating when an operation has launched may be used during playback to determine when to launch the operation, and a function event indicating when the operation has finished may be used during playback to determine when to wait for the operation to finish. Tracking both of these times allows for playback to simulate execution duration of an operation accurately, impacting when output of the operation is visible to other nodes.

In some examples, recording services on different compute systems may be subscribed to all nodes on their respective compute systems such that recording services do not receive metadata from nodes executing on different compute systems.

Referring to FIG. 3, deployment graph 340 is used during runtime 360. In particular, deployment graph 340 may be generated while compiling the graph application and the resulting executable code is executed on one or more compute systems during runtime 360. In some examples, deployment graph 340 requires that portions of the resulting executable code be executed on particular compute systems during runtime 360 as further discussed in the figures below. For example, a process (e.g., a node part of the graph application, such as the recording service, or a separate process) may execute on a compute system and establish one or more edges for a recording service. In such an example, the process may use a list of nodes and edges associated with one or more compute systems to establish data channels for each edge and metadata channels for each node. The data channels may duplicate data being sent for the graph application, such as message content sent between nodes, timing information sent by timer nodes, and the like. In some examples, the recording service may access the data without the data channel needing to duplicate the data. The metadata channels may be used by nodes to send metadata, corresponding to execution of nodes (e.g., triggers sent and received and other information metadata discussed herein), to the recording service.

Figure 4:
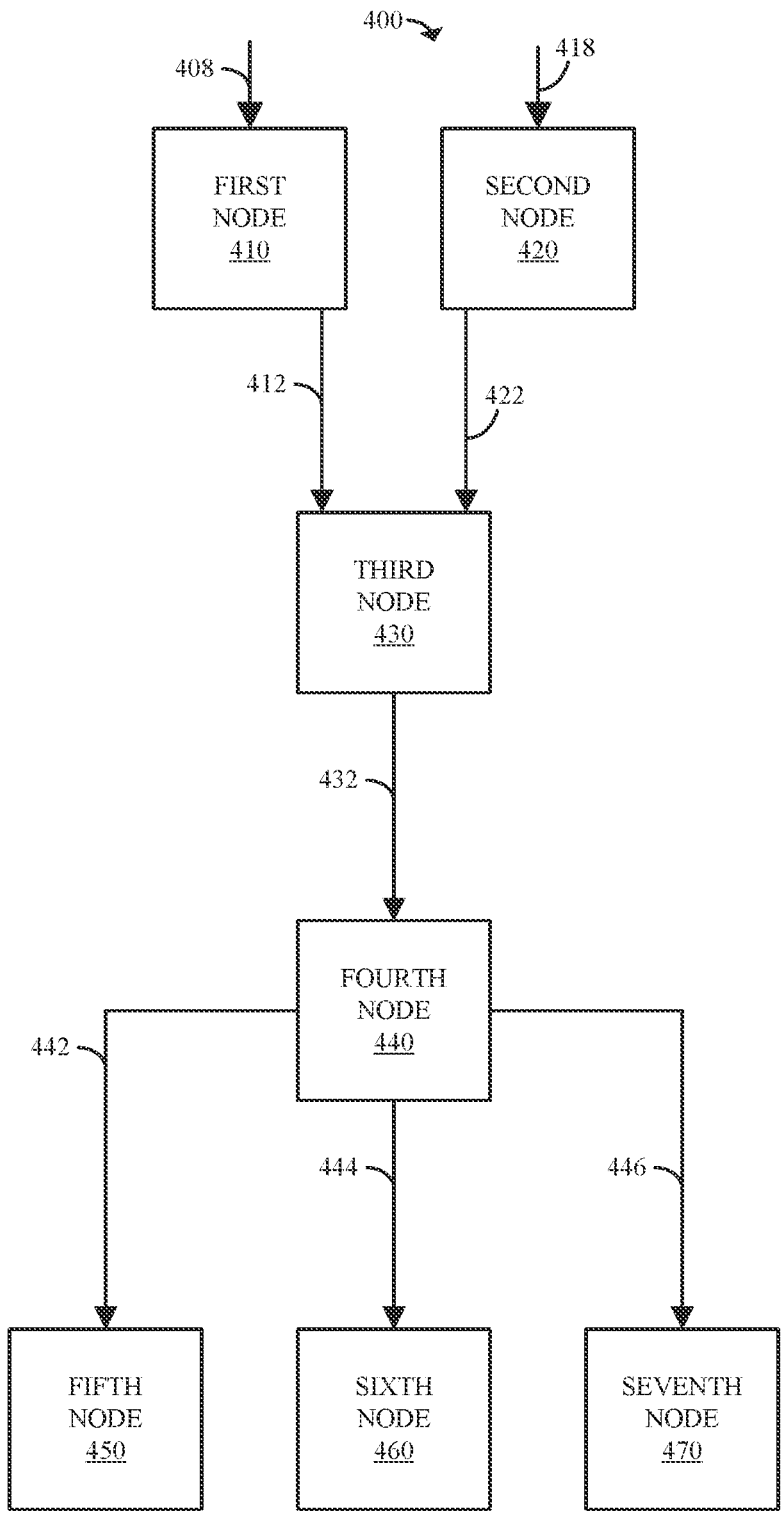
FIG. 4 is a block diagram illustrating a logical graph for a graph application.
Figure 5:
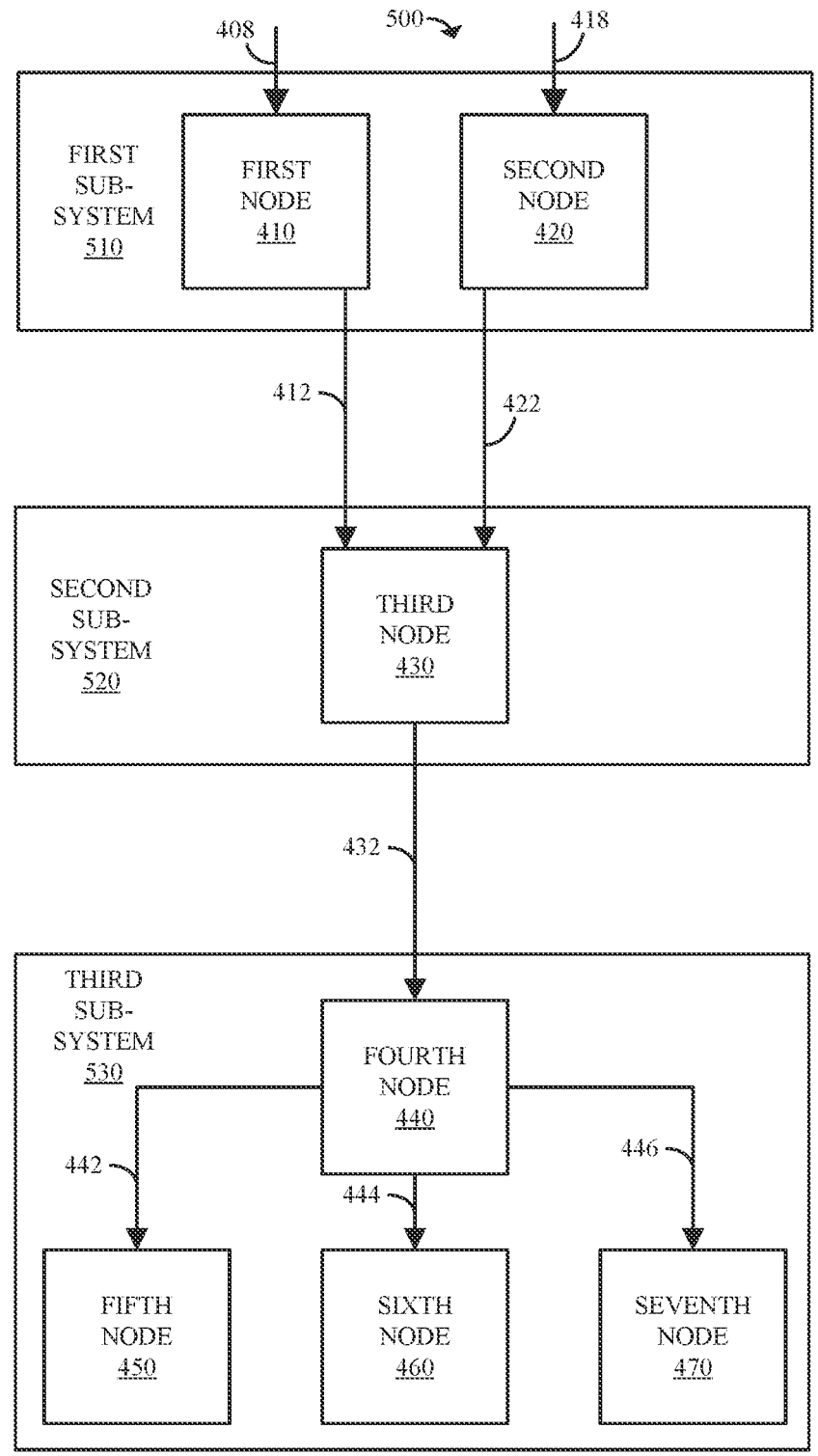
FIG. 5 is a block diagram illustrating a deployment graph for a graph application.
Figure 6:
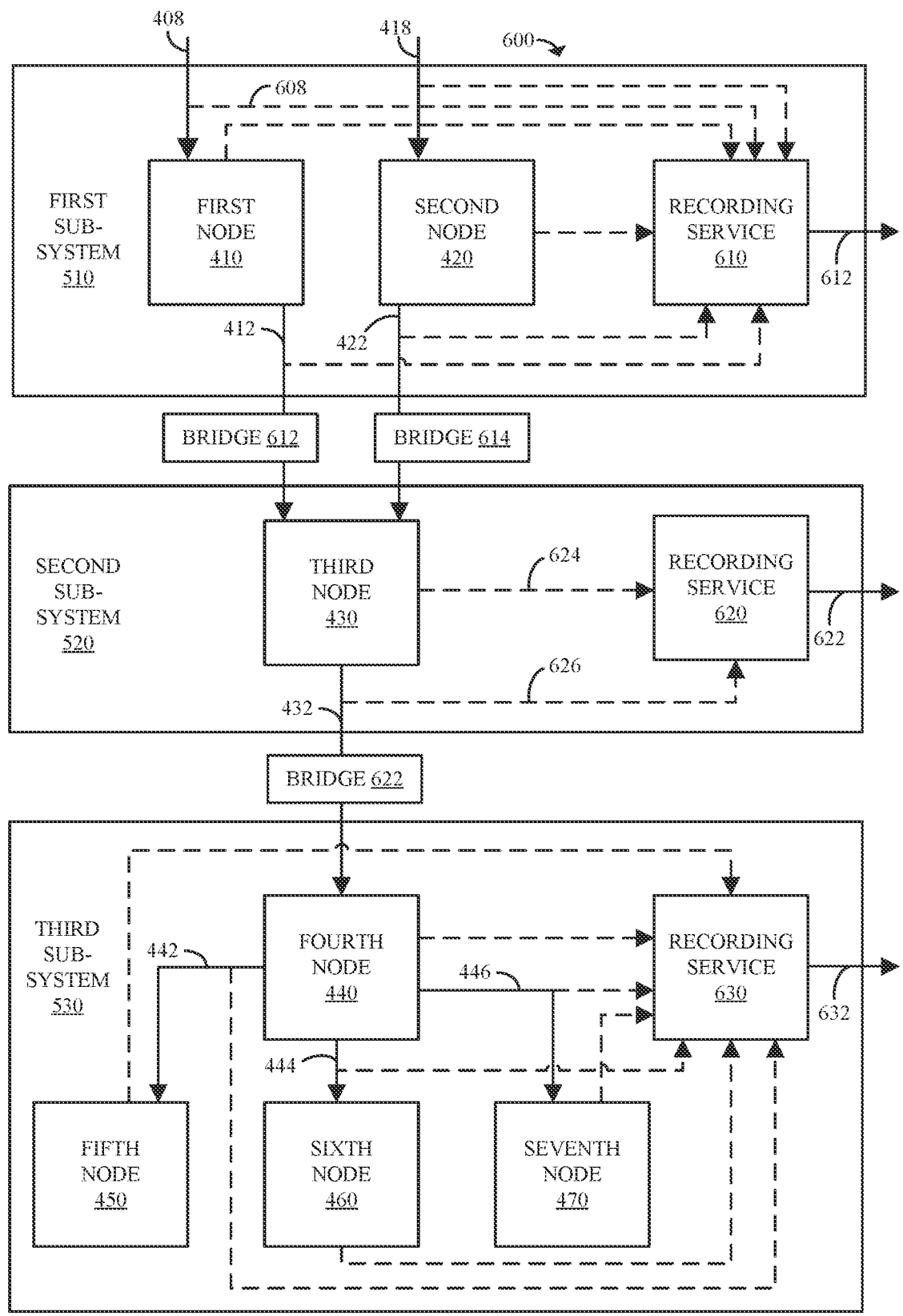
FIG. 6 is a block diagram illustrating a deployment graph with bridges and recording services for a graph application.

FIGS. 4-6 are block diagrams illustrating different components of a graph application being used during runtime.

The block diagrams are intended to merely be examples. It should be recognized that alternative configurations may be used.

FIG. 4 is a block diagram illustrating logical graph 400 for a graph application. Logical graph 400 includes multiple nodes (e.g., first node 410, second node 420, third node 430, fourth node 440, fifth node 450, sixth node 460, and seventh node 470). In some examples, a node corresponds to one or more operations that are logically grouped together into a single operational unit.

Some of the nodes in logical graph 400 are connected via an edge to another node in logical graph 400. An edge corresponds to data being sent from one node to another, shown using a line connecting two different nodes (e.g., the line between first node 410 and third node 430). In some examples, an edge is directed such that it indicates the direction of data, such as first node 410 is sending data to third node 430 through edge 412.

Some of the edges in logical graph 400 are only connected to one node, illustrated by an arrow starting from a location not corresponding to a node and connecting to a node (e.g., edge 408 and edge 418). Such origin-less edges indicates that data is coming into or out of a node from or to a location with one or more operations that are not known by the application. An example of such a location is a third-party sensor and/or a remote server that is configured to send data to a node within the graph application. For example, the graph application may require that a node identify a current weather but the graph application may not include code for sensing the current weather. Instead, the graph application may use an application programming interface (API) and/or other method for obtaining the current weather from another compute system to receive an identification of the current weather.

As depicted in FIG. 4, first node 410 receives data through edge 408. First node 410 may execute one or more operations based on data received through edge 408 and send data to third node 430 through edge 412. In some examples, first node 410 receives data at different times through edge 408 and sends data at different times through edge 412. Second node 420 receives data through edge 418. Second node 420 may execute one or more operations based on data received through edge 418 and send data to third node 430 through edge 422. Third node 430 may execute one or more operations based on data received through edge 412 and edge 422 and send data to fourth node 440 through edge 432. Fourth node 440 may execute one or more operations based on data received through edge 432 and send data to (1) fifth node 450 through edge 442, (2) sixth node 460 through edge 444, and (3) seventh node 470 through edge 446. In some examples, the data sent from fourth node 440 to each other node may be the same or different. For example, fourth node 440 may store data at a particular location and send a trigger indicating that the data has been stored to each of fifth node 450, sixth node 460, and seventh node 470. While not illustrated in FIG. 4, it should be recognized that an operation executed by a node may cause data to be sent to a node not included in logical graph 400 and/or stored in memory not included in logical graph 400.

FIG. 5 is a block diagram illustrating deployment graph 500 for a graph application. In some examples, deployment graph 500 is generated while compiling the graph application, such that deployment graph 500 was not defined before compiling the graph application.

Deployment graph 500 is based on logical graph 400, in that nodes and edges defined in logical graph 400 are included in deployment graph 500. Deployment graph 500 includes three different subsystems (i.e., first subsystem 510, second subsystem 520, and third subsystem 530). In some examples, each of the subsystems may be defined in a hardware model, as described above.

As depicted in FIG. 5, first subsystem 510 includes first node 410 and second node 420. This indicates that operations performed by each of first node 410 and second node 420 are executed by one or more processors included in first subsystem 510. In some examples, such operations are performed concurrently by multiple processors and/or through whatever scheme is enforced by an operating system executing on first subsystem 510. Edge 408 and edge 418 are illustrated as beginning outside of first subsystem 510. This indicates that data received through edge 408 and edge 418 is from outside of first subsystem 510. In some examples, an origin-less edge may begin inside of first subsystem 510, indicating that data is being produced by a process executing on first subsystem 510 that is not defined in deployment model 500. As mentioned with respect to FIG. 4, first node 410 sends data to third node 430 through edge 412. FIG. 5 depicts that edge 412 begins within first subsystem 510 and ends within second subsystem 520, indicating that data will be transferred from one subsystem to another. Similarly, edge 420 begins within first subsystem 510 and ends within second subsystem 520, indicating that data will be transferred from one subsystem to another.

Second subsystem 520 includes third node 420. This indicates that operations performed by third node 430 are executed by one or more processors included in second subsystem 520. In some examples, such operations are performed concurrently by multiple processors and/or through whatever scheme is enforced by an operating system executing on second subsystem 520 (potentially a different operating system from the operating system executing on first subsystem 510). As mentioned with respect to FIG. 4, third node 430 sends data to fourth node 440 through edge 432. FIG. 5 depicts that edge 432 begins within second subsystem 520 and ends within third subsystem 530, indicating that data will be transferred from one subsystem to another.

Third subsystem 530 includes fourth node 440, fifth node 450, sixth node 460, and seventh node 470. This indicates that operations performed by each of fourth node 440, fifth node 450, sixth node 460, and seventh node 470 are executed by one or more processors included in first subsystem 510. In some examples, such operations are performed concurrently by multiple processors and/or through whatever scheme is enforced by an operating system executing on third subsystem 530 (potentially a different operating system from the operating system executing on first subsystem 510 and/or second subsystem 520). As mentioned with respect to FIG. 4, fourth node 430 sends data to fifth node 450 through edge 442, sixth node 460 through edge 444, and seventh node 470 through edge 446. FIG. 5 depicts that edge 442, edge 444, and edge 446 begin and end within third subsystem 530, indicating that data will not be sent to another subsystem. Based on discussion above, it should be recognized that data associated with edge 442, edge 444, or edge 446 may be stored in memory associated with fourth node 440, fifth node 450, sixth node 460, or seventh node 470 and accessed by a node requiring the data.

FIG. 6 is a block diagram illustrating deployment graph 600 with bridges and recording services for a graph application. In some examples, deployment graph 600 is generated while compiling the graph application, such that deployment graph 500 was not defined before compiling the graph application.

Deployment graph 600 is based on logical graph 400, in that nodes and edges defined in logical graph 400 are included in deployment graph 600. In some examples, deployment graph 600 is an alternative or further processed version of deployment graph 500 as depicted in FIG. 5. The description below for FIG. 6 will add to the description of FIG. 5, intending to add to what was included in deployment graph 500.

As depicted in FIG. 6, first subsystem 510 further includes recording service 610. In some examples, recording service 610 was not defined in the graph application before compiling the graph application. In such examples, recording service 610 is configured to receive data corresponding to each edge associated with first subsystem 510. For example, recording service 610 is configured to receive a copy of data provided to first node 410 through edge 408. In some examples, generating and sending the copy is performed by an I/O device and/or interface (e.g., I/O interface 130 or I/O device 140) or an operating system of first subsystem 510. In such examples, the I/O device and/or interface or the operating system receives data from a device external to first subsystem 510 and sends the data to both first node 410 and recording service 610. In other examples, generating and sending the copy is performed by first node 410. In such examples, the first node 410 receives data from a device external to first subsystem 510 and sends the data to recording service 610 (e.g., when first subsystem 510 is not performing another operation, such as after waiting until finished performing operations based on data received through edge 408). In other examples, no copy is made but the recording service has direct access to the data via edge 408. Similar operations may be performed with data with respect to second node 420 and edge 418. For another example, recording service 610 is configured to receive a copy of data provided to third node 430 through edge 412. In some examples, generating and sending the copy is performed by an I/O device and/or interface (e.g., I/O interface 130 or I/O device 140) or the operating system of first subsystem 510. In such examples, the I/O device and/or interface or the operating system receives data from first node 410 and sends the data to both third node 430 and recording service 610. In other examples, generating and sending the copy is performed by first node 410. In such examples, the first node 410 send data to both third node 430 and recording service 610 (e.g., sent to recording service 610 when first subsystem 510 is not performing another operation, such as after waiting until finished performing operations based on data received through edge 408). In some examples, recording service 610 subscribes to a data channel corresponding to edge 412 such that recording service 610 is notified when first node 410 publishes to the data channel. Similar operations may be performed with respect to second node 420 and edge 422.

Recording service 610 is also configured to receive data (e.g., metadata, as discussed above) corresponding to operations performed by each node of first subsystem 510. In some examples, such data is sent by first node 410 or the operating system of first subsystem 510 when first subsystem 510 is not performing another operation, such as after waiting until finished performing operations based on data received through edge 408 or edge 418. Similar operations may be performed by second node 420.

In some examples, edges to recording service 610 are configured to be created during execution. In such examples, a process (e.g., recording service 610 or another process executing on first subsystem 510) identifies a list of nodes executing on first subsystem 510 and a list of edges associated with first subsystem 510. The process, using the list of nodes, add a channel (sometimes referred to as a data channel) for each node to connect to recording service 610 to ensure that operations being performed by nodes within first subsystem 510 are reported to recording service 610. The process, using the list of edges, adds a channel for each edge to connect to recording service 610 to ensure that data (or pointers to data) that is being passed within first subsystem 510 are provided to recording service 610.

FIG. 6 illustrates that similar operations discussed above with respect to recording service 610 occur with respect to separate recording services on subsystem 520 (e.g., recording service 620) and subsystem 530 (e.g., recording service 630). In some examples, data received by a node on a subsystem from another node on another subsystem is not sent to a recording service of the system. For example, data corresponding to edge 412 is not sent to recording service 620, as illustrated in FIG. 6. In other examples, data received by a node on a subsystem from another node on another subsystem is sent to a recording service of the system. For example, data corresponding to edge 412 may be sent to recording service 620 (similar to as described above with respect to edge 408 and recording service 610), as not illustrated in FIG. 6.

FIG. 6 also illustrates that each recording service is configured to send data out of their respective subsystem, such as recording service 610 through edge 612. In other examples, the recording service may be configured to save the data to local storage via an application programming interface (API) instead of sending data through an edge. Such data may correspond to data received by recording service 610 (e.g., data associated with edge 408, first node 410, and/or edge 412). In some examples, such data is temporarily stored in local storage or a buffer (e.g., a ring buffer) on first subsystem 510 and only sent via edge 612 when it is determined that an event occurred. The buffer may be configured to store data that comes in and store such data for a period of time, such as using a first-in-first-out mechanism that removes the oldest data first when new data arrives and additional space is needed.

In some examples, the determination that an event occurred may be made by recording service 610, a node on first subsystem 510 (e.g., first node 410 or second node 420), another node on another subsystem (e.g., third node 430 or recording service 620), a process associated with the graph application that is executing on one of the subsystems (e.g., first subsystem 510, second subsystem 520, or third subsystem 530), or a process executing on a remote device (e.g., a notification system that is wirelessly communicating with first subsystem 510, second subsystem 520, and/or third subsystem 530. In such examples, the determination may include determining a type of the event and, based on the type of event, determining an amount of data to send via edge 612. For example, different types of events may cause different amounts of data to be sent via edge 612, such as data corresponding to 5 mins in the past is sent for a first type of event and data corresponding to 10 mins in the past is sent for a second type of event.

In some examples, data sent via edge 612 includes an identifier (e.g., UUID) associated with a particular execution of the graph application. For example, at the start of execution of the graph application, recording service 610 may be provided the identifier to be used for sending data associated with the execution outside of first subsystem 510.

FIG. 6 further depicts that second subsystem 520 further includes recording service 620 and third subsystem 530 includes recording service 630. It should be recognized that recording service 620 and recording service 630 operate similar to recording service 610 described above.

An example of a detector node receiving images from two camera nodes will now be discussed using FIG. 6. It should be recognized that this example is used to show how deployment graph 600 may be used in runtime and what data is being sent to a recording service. The example will only refer to operations associated with second subsystem 520. In the example, first node 410 and second node 420 are camera nodes that are each configured to store an image in memory of second subsystem 520 and notify third node 430 that the images have been stored. The third node 430 is a detector node that is configured to activate in response to receiving triggers from both first node 410 and second node 420 indicating that each has stored an image. The third node, after activating, is configured to determine whether there is an error with the images and notify fourth node 440 whether there is an issue.

The example starts with execution of a graph application, including executing third node 430 and recording service 620 on second subsystem 520. After initiating execution of recording service 620, third node 430 is identified and metadata channel 624 is established between third node 430 and recording service 620. In addition, edge 432 is identified and data channel 626 is established between third node 430 and recording service 620 for edge 432. In some examples, recording service 620 identifies and establishes metadata channel 624 and data channel 626. In other examples, a different process (other than recording service 620) identifies and establishes metadata channel 624 and data channel 626.

After initiating execution of third node 430, third node 430 generates a node launch event and sends the node launch event to recording service 620 through metadata channel 624. The node launch event indicates that third node 430 began execution at a particular time. The third node 430, after sending the node launch event, then transitions to a sleep mode to wait to receive triggers from both first node 410 and second node 420.

After third node 430 transitions to the sleep mode, first node 410 stores a first image in memory of second subsystem 520. Storing the first image includes sending the first image through edge 412 and bridge 612 to the memory of second subsystem 520 and notifying third node 430 via a trigger that the first image has been stored in the memory. Based on receiving only the one notification, third node 430 transitions into an active mode but does not attempt to obtain the first image or do any operations using the first image. Instead, third node 430 generates and sends a trigger event with a count of one and transitions back to a sleep mode. Then, third node 430 continues to wait to receive a notification from second node 420. The storage of the first image may not cause any data to be sent to recording service 620 via metadata channel 624. Instead, data (e.g., the first image) may be sent to recording service 620 via a data channel corresponding to edge 412 (e.g., a copy of edge 412 on second subsystem 520, similar to edge 608) that is connected to recording service 620 (not illustrated in FIG. 6).

At a later time, second node 420 stores a second image in the memory of second subsystem 520. Storing the second image includes sending the second image through edge 522 and bridge 614 to the memory of second subsystem 520 and notifying third node 430 via a trigger that the second image has been stored in the memory.

In response to being notified of both the first image and the second image, third node 420 transitions from the sleep mode to the active mode and identifies (e.g., based on the notifications) data available (e.g., a range of memory locations) for third node 430 to access, including data associated with the first image and the second image. In response to identifying the available data, third node 430 generates a data range event and sends the data range event to recording service 620 through metadata channel 624. The data range event indicates that third node 430 has identified the available data at a particular time.

In addition to the data range event (either before, at the same time, or after sending the data range event), third node 430 identifies a trigger received from node 420. In response to identifying the trigger, third node 430 generates a trigger event and sends the trigger event to recording service 620 through metadata channel 624. The trigger event indicates that third node 430 has identified the count of triggers received at a particular time (e.g., third node 430 has received two triggers since last being in the active mode).

After sending the trigger event and/or the data range event, third node 430 executes a start function. In response to executing the start function, third node 430 generates a first function event and sends the first function event to recording service 620 through metadata channel 624. The first function event indicates that third node 430 began executing the start function at a particular time.

As part of the first function, third node 430 sends a first instruction to obtain the first image. In addition to the first instruction, third node 430 generates a first read event and sends the first read event to recording service 620 through metadata channel 624. The first read event indicates that third node 430 is requesting to read the first image at a particular time.

In addition to the first instruction (either at the same time or after sending the first instruction), third node 430 sends a second instruction to obtain the second image. In addition to the second instruction, third node 430 generates a second read event and sends the second read event to recording service 620 through metadata channel 624. The second read event indicates that third node 430 is requesting to read the second image at a particular time.

After sending the first instruction, third node 430 determines that third node 430 has finished reading the first image. In response to this determining, third node 430 generates a third read event and sends the third read event to recording service 620 through metadata channel 624. The third read event indicates that third node 430 has finished reading the first image at a particular time. Third node 430 stores the first image in memory.

After sending the second instruction, third node 430 determines that third node 430 has finished reading the second image. In response to this determining, third node 430 generates a fourth read event and sends the fourth read event to recording service 620 through metadata channel 624. The fourth read event indicates that third node 430 has finished reading the second image at a particular time. Third node 430 stores the second image in memory.

In response to completing the start function, third node 430 generates a second function event and sends the second function event to recoding service 620 through metadata channel 624. The second function event indicates that third node 430 has completed the start function at a particular time.

After executing the start function, third node 430 executes a comparison function to determine whether there is an issue when comparing the first image in memory with the second image in memory. In response to executing the comparison function, third node 430 generates a third function event and sends the third function event to recording service 620 through metadata channel 624. The third function event indicates that third node 430 began executing the comparison function at a particular time.

As part of the comparison function, third node 430 initiates writing a result of whether there is an issue to the memory of second subsystem 520. In response to initiating the writing, third node 420 generates a first write event and sends the first write event to recording service 620 through metadata channel 624. The first write event indicates that third node 430 is requesting to write the result at a particular time.

After initiating the writing, third node 430 determines that the result has finished being written to the memory. In response to this determining, third node 430 generates a second write event and sends the second write event to recording service 620 through metadata channel 624. The second write event indicates that third node 430 has finished writing the result at a particular time.

In addition to generating the second write event (either at the same time or after the second write event), third node 430 generates and sends (1) a first trigger to fourth node 440 through edge 432 and bridge 622 and, optionally, (2) a second trigger to recording service 620 through metadata channel 624 (in some examples, the second trigger is not sent to recording service 620 and instead recording service 620 runs periodically). The first and second trigger each indicate that third node 430 has stored the result. Based on sending the trigger, third node 430 generates a trigger event and sends the trigger event to recording service 620 through metadata channel 624. The trigger event indicates that third node 430 sent a single trigger at a particular time.

Before or after sending the trigger, third node 430 completes the comparison function. In response to completing the comparison function, third node 430 generates a fourth function event and sends the fourth function event to recording service 620 through metadata channel 624. The fourth function event indicates that third node 430 has completed the comparison function at a particular time.

After sending the fourth function event, third node 430 transitions to the sleep mode to wait for additional images to be received. Similar functions as described above are performed as third node 430 receives additional images from first node 410 through edge 412 and second node 420 through edge 422, including reporting information about execution of third node 430 using metadata channel 624 and sending additional triggers and data to node 440.

Figure 7:
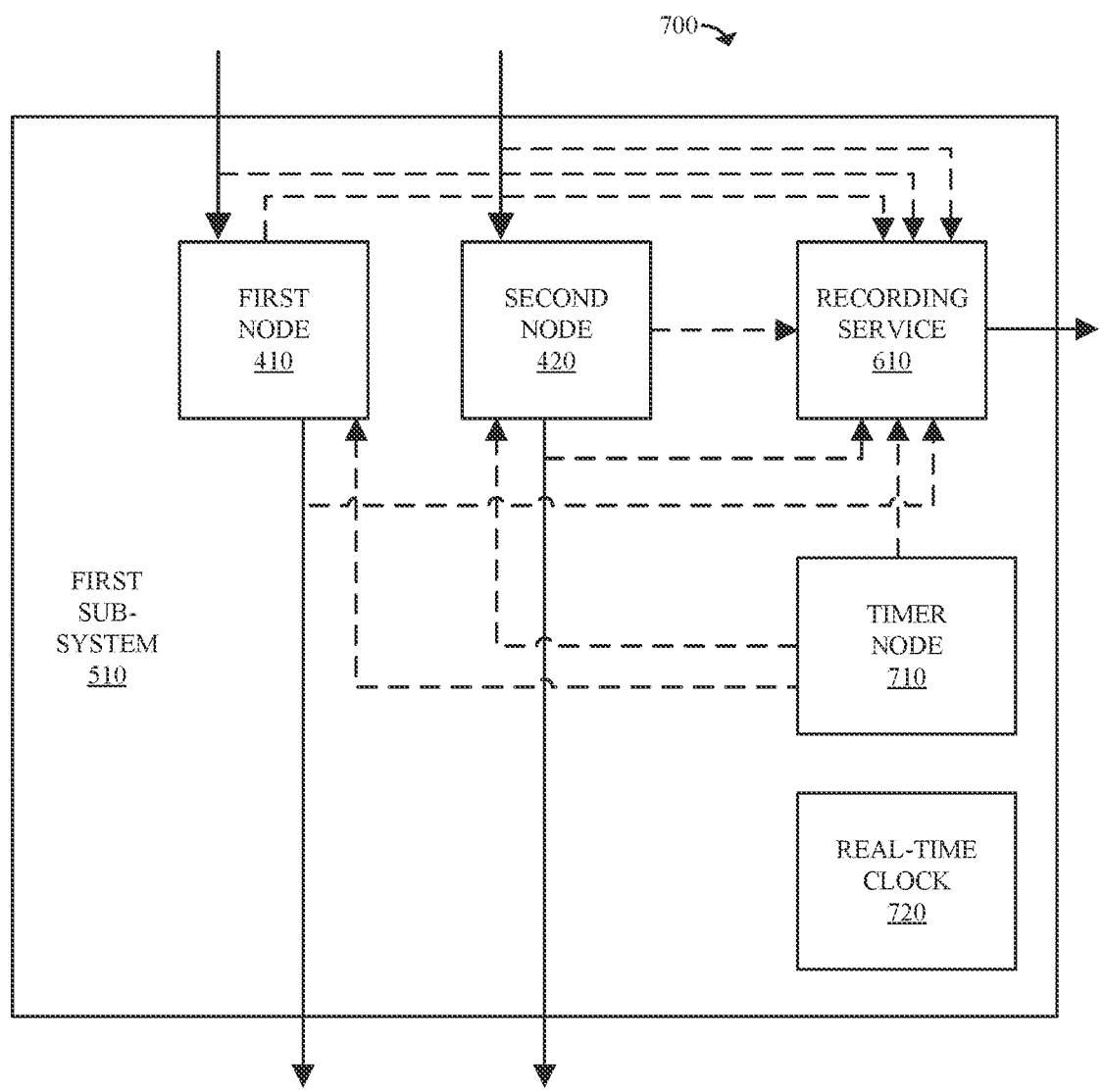
FIG. 7 is a block diagram illustrating a deployment graph of a subsystem with a timer node for a graph application.

FIG. 7 is a block diagram illustrating deployment graph 700 of first subsystem 510 with timer node 710 for a graph application. In some examples, deployment graph 700 is generated while compiling the graph application, such that deployment graph 700 was not defined before compiling the graph application.

Deployment graph 700 is based on logical graph 400, in that nodes and edges defined in logical graph 400 are included in deployment graph 700. In some examples, deployment graph 600 is an alternative or further processed version of deployment graph 600 as depicted in FIG. 6. The description below for FIG. 7 will add to the description of FIG. 6, intending to add to what was included in deployment graph 600.

As depicted in FIG. 7, first subsystem 510 further includes timer node 710 and real-clock 720. In some examples, timer node 710 was not defined in the graph application before compiling the graph application and real-time clock 720 was included in first subsystem 510 regardless of the graph application (e.g., real-time clock 720 executes independent of the graph application). In such examples, timer node 710 is configured to receive a current time from real-time clock 720 and determine when to notify a node of the graph application of the current time. In some examples, timer node 710 determines when to notify based on definitions of different nodes. For example, first node 410 may be defined to require a current time as input when executing. In such an example, timer node 710 identifies this requirement and determines to send the current time to first node 410 when first node 410 is executing. In some examples, first node 410 may require a current time at a set interval (e.g., every 5 seconds). In such examples, timer node 710 provides the current time according to the set interval. While timer node 710 is illustrated as sending a current time to both first node 410 and second node 420, it should be recognized that in some examples timer node 710 may send to only one of the nodes or send to each node at a different rate.

FIG. 7 depicts that timer node 710 sends data to recording service 610. In some examples, the data is a copy of a current time sent to another node of the graph application, such as first node 410 and/or second node 420. In such examples, timer node 710 duplicates a message sent to a node executing on first subsystem 510 and sends the duplicate message to recording service 610. The duplicate message will include the time sent to the node along with a current time received from real-time clock 720. In other examples, the message does not have to be duplicated for both receiving nodes to read it. In some examples, the time sent to the node and the current time received from real-time clock 720 are different because timer node 710 was configured to send the time to the node at a set interval and timer node 710 did not send the time at that time. In such examples, a time corresponding to the set interval will be sent to the node and the recording service 610 as data in the message and the current time received from real-time clock 720 will be sent to the recording service 610 (and not the node) via a metadata event with the time corresponding to the set interval. This allows us to ensure that nodes of the graph application receive are provided a consistent view of a current time that is based on what the node is expecting instead of an actual current time that might be delayed based on operation of first subsystem 510.

Figure 8:
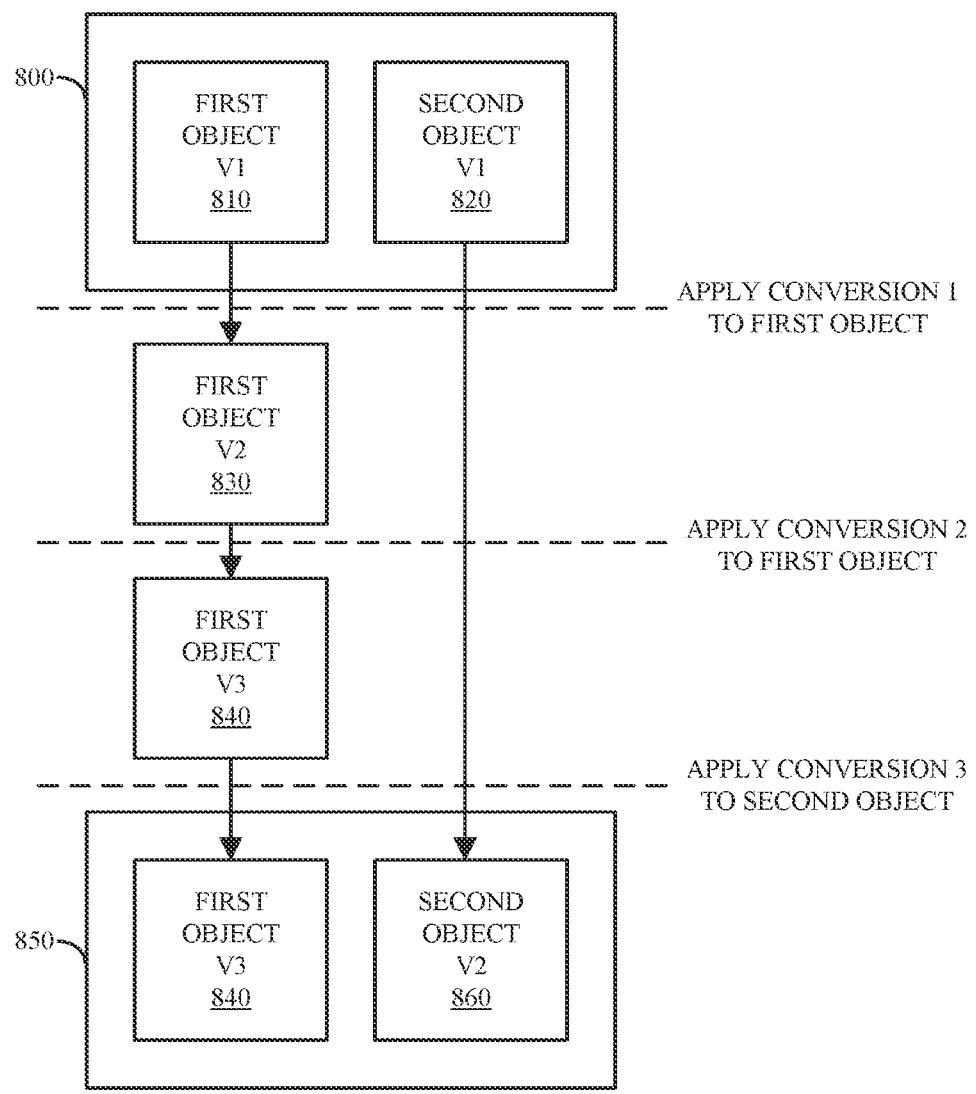
FIG. 8 is a block diagram illustrating conversion of a composite message into a current version.

FIG. 8 is a block diagram illustrating conversion of composite message 800 into a current version. In some examples, such conversion is performed while a graph application is executing (i.e., during runtime), either in real time or through playback of an execution of the graph application.

In some examples, the conversion is performed when a node is intended to receive a message that is in accordance with a version of the message that is not current (i.e., a previous version of the message). For example, a message may include a field that has evolved over time. The field might have originally been an integer and later transformed into a double. In such an example, the field of the message would be converted from an integer to a double before a node uses the message. In some examples, the conversion is performed before the node receives the message by a process executing outside of the node. In other examples, the conversion is performed by the node in response to receiving the message.

As depicted in FIG. 8, composite message 800 includes two different objects (i.e., first object V1 810 and second object V1 820). Each object within composite message 800 is intended to represent one or more fields, such as a primitive type or a message with a message. In some examples, a process determines that first object V1 810 is a previous version. In such examples, the process identifies a first conversion function to convert first object V1 810 to a subsequent version and applies the first conversion function to first object V1 810, resulting in first object V2 830. After applying the first conversion function, the process determines that first object V2 830 is a previous version. In such examples, the process identifies a second conversion function to convert first object V2 830 to a subsequent version and applies the second conversion function to first object V2 830, resulting in first object V3 840. After applying the second conversion function, the process determines that first object V3 840 is a current version and thus no further conversion is needed for first object V3 840. The process (or another process), either concurrently with or after operations described above with respect to the first object, determines that second object V1 820 is a previous version. In such examples, the process identifies a third conversion function to convert second object V1 820 to a subsequent version and applies the third conversion function to second object V1 820, resulting in second object V2 860. After applying the third conversion function, the process determines that second object V2 860 is a current version and thus no further conversion is needed for second object V2 860. After determining that both first object V3 840 and second object V2 860 are a current version, the process packages the object within updated message 850 and provides updated message 850 to the node intended to receive composite message 800 to be used during execution of the node.

In some examples, the conversion functions described above are defined by a developer, such as when updating an object to a new version. In such examples, the developer indicates that a current version of the object is to be frozen and an updated version is to be added. After indicting the current version is to be frozen, the developer uploads the updated version and adds a function to convert from the current version to the updated version.

Figure 9:
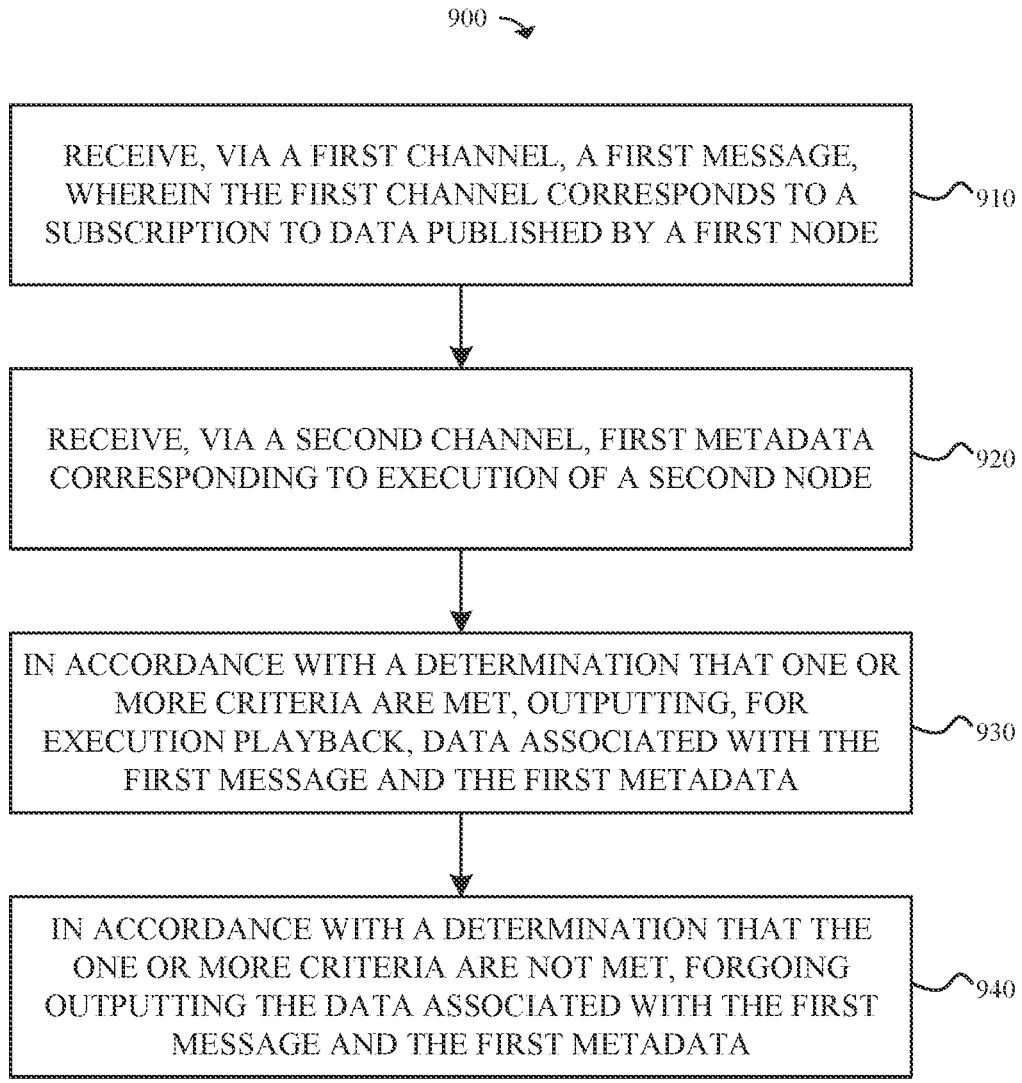
FIG. 9 is a flow diagram illustrating a method for allowing playback of an operation performed by a node.

FIG. 9 is a flow diagram illustrating method 900 for allowing playback of an operation performed by a node. In some examples, the playback is on a different system, such as a different system with the same or different hardware configuration. In some examples, the playback is for multiple operations performed by a node or multiple operations performed by multiple nodes. Some operations in method 900 are, optionally, combined, the orders of some operations are, optionally, changed, and some operations are, optionally, omitted. In some examples, method 900 is performed at a compute system (e.g., compute system 100) by a recording service (e.g., a recording node of a graph application). In some examples, the recording service is executing on the same or different process as a node for which the recording service is recording metadata.

At 910, method 900 includes receiving, via a first channel (e.g., a data channel), a first message, wherein the first message includes a first identification of the first message, and wherein the first channel (in some examples, the first message includes data; in some examples, the first message includes a memory location of data) corresponds to a subscription to data published by a first node (in some examples, the first channel is established by the recording service; in some examples, there is a different channel that corresponds to a subscription by the second node to data published by the first node, where the first channel is established to mimic the different channel). In some examples, the recording service is executing on the same process as the second node (in some examples, the same one or more processors are executing the recording service and the second node; in some examples, an operating system is managing resources for both the recording service and the second node; in some examples, the recording service and the second node are sharing the same set of resources). In some examples, the process is running a real-time operating system, and wherein an operation from the second node has priority over an operation from the recording service (in some examples, having priority results in allowing operations from the second node complete before operations from the recording service; in some examples, having priority results in allowing operations from the second node to execute instead of operations from the recording service when both are ready to be executed; in some examples, having priority results in operations from the second node interrupting execution of operations from the recording service but not operations from the recording service interrupting operations from the second node).

At 920, method 900 includes receiving, via a second channel (e.g., a metadata channel) different from the first channel, first metadata corresponding to execution of a second node different from the first node (in some examples, the second channel corresponds to a subscription to data published by the second node with respect to one or more operations performed by the second node), wherein the first metadata includes: an identification of an operation (in some examples, the operation includes start/end of a function, a start/end of a request to read/write data, a latch attached/ released, or a trigger reached) performed by the second node and a second identification of the first message (in some examples, the second identification is the same as the first identification). In some examples, the first metadata (in some examples, the first metadata is trigger metadata) includes an indication of a number (e.g., a count) of triggers (in some examples, the number is how many were sent or received by a trigger edge since metadata related to number of triggers was last sent; in some examples, a trigger is a request to perform an operation). In some examples, the identification of the operation indicates a start or an end of a read or a write (in some examples, the metadata is event metadata). In some examples, the first message includes a timestamp for determining when to send the first message during playback, and wherein the first metadata includes a timestamp for determining when to execute the operation identified by the first metadata.

At 930, method 900 includes, in accordance with a determination that one or more criteria are met (in some examples, a criterion of the one or more criteria is met when a hardware device hosting the recording service has bandwidth to output the data associated with the first message and the first metadata; in some examples, a criterion of the one or more criteria is met when an event occurs that is determined to require outputting), outputting (in some examples, outputting includes sending to another device; in some examples, outputting includes writing to memory, such as persistent memory on a device executing the recording service), for execution playback, data associated with the first message (in some examples, the data associated with the first message is included in the first message; in some examples, the data associated with the first message is accessed using information in the first message) and the first metadata.

At 940, method 900 includes, in accordance with a determination that the one or more criteria are not met (in some examples, a criterion of the one or more criteria is not met when a hardware device hosting the recording service does not have bandwidth to output the data associated with the first message and the first metadata; in some examples, a criterion of the one or more criteria is not met when no event has occurred that would require outputting of the data and the first metadata), forgoing outputting the data associated with the first message and the first metadata (in some examples, the data and the first metadata is not output until the one or more criteria are met; in some examples, the data and the first metadata is only stored by the recording service for a certain amount of time before it is deleted and no longer able to be output).

In some examples, method 900 further includes receiving, via the second channel (i.e., the same metadata channel that metadata for the second node was already sent using), second metadata corresponding to execution of the second node, wherein the second metadata: does not include an identification of a message published by a node (i.e., this shows that some metadata indicate a message and others do not) and includes: an identification of a function executing by the second node and an identification of a data range (e.g., an available data range, a memory location, a range of memory, a range of data, or a start and end of data stored in a location). In such examples, method 900 further includes, in accordance with a determination that one or more second criteria are met (in some examples, the one or more second criteria are the one or more criteria), outputting the second metadata (in some examples, the second metadata is output with the first metadata; in some examples, the second metadata is output separate from the first metadata); and in accordance with a determination that the one or more second criteria are not met, forgoing outputting the second metadata.

In some examples, method 900 further includes receiving, via the second channel (i.e., the same metadata channel that metadata for the second node was already sent using), third metadata corresponding to execution of the second node, wherein the third metadata: does not include an identification of a message published by a node and includes an indication of a start or an end of a function of (e.g., executing by) the second node (e.g., whether the function is starting or ending). In such examples, method 900 further includes, in accordance with a determination that one or more third criteria are met (in some examples, the one or more third criteria are the one or more criteria), outputting the third metadata (in some examples, the third metadata is output with the first metadata; in some examples, the third metadata is output separate from the first metadata); and in accordance with a determination that the one or more third criteria are not met, forgoing outputting the third metadata.

In some examples, method 900 further includes receiving, via a third channel (e.g., a metadata channel) different from the first channel and the second channel (in some examples, the third channel is a data channel and not a metadata channel), a second message, wherein the second message includes a first identification of the second message, and wherein the third channel corresponds to a subscription to data published by a third node different from the second node (in some examples, the third node is the same as the first node; in some examples, the third node is different from the first node). In such examples, method 900 further includes receiving, via the second channel (i.e., the same metadata channel that metadata for the second node was already sent using), fourth metadata corresponding to execution of the second node, wherein the fourth metadata includes: an identification of an operation (in some examples, the operation includes start/end of a function, a start/end of a request to read/write data, a latch attached/released, or a trigger reached) performed (e.g., executed) by the second node (e.g., an operation of the second node) and a second identification of the second message (in some examples, the second identification is the same as the first identification). In such examples, method 900 further includes, in accordance with a determination that one or more fourth criteria are met (in some examples, the one or more fourth criteria are the one or more criteria), outputting data associated with the second message and the fourth metadata (in some examples, the data associated with the second message is output with the fourth metadata; in some examples, the data associated with the second message is output with the data associated with the first message); and in accordance with a determination that the one or more fourth criteria are not met, forgoing outputting the data associated with the second message and the fourth metadata.

In some examples, method 900 further includes receiving, via the second channel (i.e., the same metadata channel that metadata for the second node was already sent using), fifth metadata corresponding to execution of the second node, wherein the fifth metadata is different from the first metadata, and wherein the fifth metadata includes: an identification of an operation (in some examples, the operation includes start/end of a function, a start/end of a request to read/write data, a latch attached/released, or a trigger reached; in some examples, the operation identified in the fifth metadata is different from the operation identified in the first metadata) performed by the second node and the second identification of the first message (in some examples, the second identification is the same as the first identification). In such examples, method 900 further includes, in accordance with a determination that one or more fifth criteria are met (in some examples, the one or more fifth criteria are the one or more criteria), outputting the fifth metadata (in some examples, the fifth metadata is output with the first metadata); and in accordance with a determination that the one or more fifth criteria are not met, forgoing outputting the fifth metadata.

In some examples, method 900 further includes receiving, via the first channel (i.e., the same data channel that the first message is received on), a third message (e.g., the third message is different from the first message), wherein the third message includes a first identification of the third message. In such examples, method 900 further includes receiving, via the second channel (i.e., the same metadata channel that metadata for the second node was already sent using), fourth metadata corresponding to execution of the second node, wherein the fourth metadata includes: an identification of an operation performed by the second node; and a second identification of the third message (in some examples, the second identification is the same as the first identification). In such examples, method 900 further includes, in accordance with a determination that one or more sixth criteria are met, outputting data associated with the third message and the fourth metadata (in some examples, the data associated with the third message is sent with the fourth metadata; in some examples, the data associated with the third message is sent with the data associated with the first message); and in accordance with a determination that the one or more sixth criteria are not met, forgoing outputting the data associated with the third message and the fourth metadata.

In some examples, the first message includes a memory location of the data (e.g., a pointer) (in some examples, the first message does not include the data). In such examples, method 900 further includes, before outputting the data, obtaining, using the memory location, the data (in some examples, the data is stored in memory shared by the recording service and the second node).

In some examples, method 900 further includes receiving, via a timing channel (in some examples, the timing channel is not the first or second channel), a message including an activation time, wherein the timing channel corresponds to a subscription to timing data published by a timer node different from the second node, and wherein the activation time is used by the second node as a current time during real-time execution (in some examples, activation time is a time when a node requested to be woken up; in some examples, time is synched with other devices when the device joins network). In such examples, in some examples, method 900 further includes receiving, via the second channel (i.e., the same metadata channel that metadata for the second node was already sent using), sixth metadata corresponding to execution of the second node, wherein the sixth metadata includes an indication of real time, wherein the real time is provided by a device executing the recording service, and wherein the first node executes based on the activation time and not the real time during real-time execution.

In some examples, method 900 further includes receiving, from an application starting process at the start of execution of a graph application, a unique identifier (e.g., a UUID) (in some examples, the unique identifier is sent by the application starting process in response to starting execution of the graph application), wherein: the application starting process is different from the first node and the second node, the outputting of the data associated with the first message includes the unique identifier, and the outputting of the first metadata includes the unique identifier (in some examples, the data associated with the first message and the first metadata are output together such that only a single copy of the unique identifier is included with the data and the first metadata).

In some examples, method 900 further includes, before the outputting, storing, in a temporary buffer, the data associated with the first message and the first metadata, wherein: in accordance with a first type of event detected, the outputting includes a first portion of the temporary buffer (in some examples, the first portion corresponds to a certain amount of time in the past from when the event occurred (e.g., 10 seconds)), and in accordance with a second type of event detected, the outputting includes a second portion of the temporary buffer (in some examples, the second portion corresponds to a certain amount of time in the past from when the event occurred (e.g., 20 seconds)), and the second portion is different from the first portion (in some examples, the second portion includes the first portion).

In some examples, method 900 further includes, after the first message is output (in some examples, the following steps are not performed by the recording service): identifying that the first message is a composite message (e.g., a message that includes different parts of the message with different schemas) (e.g., a message that includes a plurality of elements, wherein a first element is a basic element and a second element is a complex element (e.g., another message within the message)), wherein the composite message includes a first portion (in some examples, the first portion has a format that is defined in a first schema defined in a first file) and a second portion (in some examples, the second portion has a format that is defined in a second schema different from the first schema, where the second schema is defined in a second file different from the first file); converting the first message from an old version to a current version, wherein the converting includes: applying a first number of conversion operations to the first portion; and applying a second number of conversion operations to the second portion, wherein the second number is different from the first number.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method for allowing playback of an operation performed by a node, the method comprising:
by a recording service:
receiving, via a first channel, a first message, wherein the first message includes a first identification of the first message, and wherein the first channel corresponds to a subscription to data published by a first node;
receiving, via a second channel different from the first channel, first metadata corresponding to execution of a second node different from the first node, wherein the first metadata includes:
an identification of an operation performed by the second node and
a second identification of the first message;
in accordance with a determination that one or more criteria are met, outputting, for execution playback, data associated with the first message and the first metadata; and
in accordance with a determination that the one or more criteria are not met, forgoing outputting the data associated with the first message and the first metadata.

2. The method of claim 1, wherein the first metadata includes an indication of a number of triggers.

3. The method of claim 1, wherein the identification of the operation indicates a start or an end of a read or a write.

4. The method of claim 1, further comprising:
by the recording service:
receiving, via the second channel, second metadata corresponding to execution of the second node, wherein the second metadata:
does not include an identification of a message published by a node and includes:
an identification of a function executing by the second node and
an identification of a data range;
in accordance with a determination that one or more second criteria are met, outputting the second metadata; and
in accordance with a determination that the one or more second criteria are not met, forgoing outputting the second metadata.

5. The method of claim 1, further comprising:
by the recording service:
receiving, via the second channel, third metadata corresponding to execution of the second node, wherein the third metadata:

does not include an identification of a message published by a node and
includes an indication of a start or an end of a function of the second node;
in accordance with a determination that one or more third criteria are met, outputting the third metadata; and
in accordance with a determination that the one or more third criteria are not met, forgoing outputting the third metadata.

6. The method of claim 1, further comprising:
by the recording service:
receiving, via a third channel different from the first channel and the second channel, a second message, wherein the second message includes a first identification of the second message, and wherein the third channel corresponds to a subscription to data published by a third node different from the second node;
receiving, via the second channel, fourth metadata corresponding to execution of the second node, wherein the fourth metadata includes:
an identification of an operation performed by the second node and
a second identification of the second; and
in accordance with a determination that one or more fourth criteria are met, outputting data associated with the second message and the fourth metadata; and
in accordance with a determination that the one or more fourth criteria are not met, forgoing outputting the data associated with the second message and the fourth metadata.

7. The method of claim 1, further comprising:
by the recording service:
receiving, via the second channel, fifth metadata corresponding to execution of the second node, wherein the fifth metadata is different from the first metadata, and wherein the fifth metadata includes:
an identification of an operation performed by the second node and
the second identification of the first message; and
in accordance with a determination that one or more fifth criteria are met, outputting the fifth metadata; and
in accordance with a determination that the one or more fifth criteria are not met, forgoing outputting the fifth metadata.

8. The method of claim 1, further comprising:
by the recording service:
receiving, via the first channel, a third message, wherein the third message includes a first identification of the third message;
receiving, via the second channel, fourth metadata corresponding to execution of the second node, wherein the fourth metadata includes:
an identification of an operation performed by the second node; and
a second identification of the third message; and
in accordance with a determination that one or more sixth criteria are met, outputting data associated with the third message and the fourth metadata; and
in accordance with a determination that the one or more sixth criteria are not met, forgoing outputting the data associated with the third message and the fourth metadata.

9. The method of claim 1, wherein the recording service is executing on the same process as the second node.

10. The method of claim 9, wherein the process is running a real-time operating system, and wherein an operation from the second node has priority over an operation from the recording service.

11. The method of claim 1, wherein the first message includes a memory location of the data, and wherein the method further comprises:
by the recording service:
before outputting the data, obtaining, using the memory location, the data.

12. The method of claim 1, wherein the first message includes a timestamp for determining when to send the first message during playback, and wherein the first metadata includes a timestamp for determining when to execute the operation identified by the first metadata.

13. The method of claim 1, further comprising:
by the recording service:
receiving, via a timing channel, a message including an activation time, wherein the timing channel corresponds to a subscription to timing data published by a timer node different from the second node, and wherein the activation time is used by the second node as a current time during real-time execution.

14. The method of claim 13, further comprising:
by the recording service:
receiving, via the second channel, sixth metadata corresponding to execution of the second node, wherein the sixth metadata includes an indication of real time, wherein the real time is provided by a device executing the recording service, and wherein the first node executes based on the activation time and not the real time during real-time execution.

15. The method of claim 1, further comprising:
by the recording service:
receiving, from an application starting process at the start of execution of a graph application, a unique identifier, wherein:
the application starting process is different from the first node and the second node,
the outputting of the data associated with the first message includes the unique identifier, and
the outputting of the first metadata includes the unique identifier.

16. The method of claim 1, further comprising:
by the recording service:
before the outputting, storing, in a temporary buffer, the data associated with the first message and the first metadata, wherein:
in accordance with a first type of event detected, the outputting includes a first portion of the temporary buffer, and
in accordance with a second type of event detected, the outputting includes a second portion of the temporary buffer, and
the second portion is different from the first portion.

17. The method of claim 1, further comprising:
after the first message is output:
identifying that the first message is a composite message, wherein the composite message includes a first portion and a second portion;
converting the first message from an old version to a current version, wherein the converting includes:
applying a first number of conversion operations to the first portion; and
applying a second number of conversion operations to the second portion, wherein the second number is different from the first number.

18. A non-transitory computer-readable storage medium storing one or more programs configured to be executed by one or more processors of a device, the one or more programs including instructions for:
receiving, via a first channel, a first message, wherein the first message includes a first identification of the first message, and wherein the first channel corresponds to a subscription to data published by a first node;
receiving, via a second channel different from the first channel, first metadata corresponding to execution of a second node different from the first node, wherein the first metadata includes:
an identification of an operation performed by the second node and
a second identification of the first message;
in accordance with a determination that one or more criteria are met, outputting, for execution playback, data associated with the first message and the first metadata; and
in accordance with a determination that the one or more criteria are not met, forgoing outputting the data associated with the first message and the first metadata.

19. The non-transitory computer-readable storage medium of claim 18, wherein the first metadata includes an indication of a number of triggers.

20. The non-transitory computer-readable storage medium of claim 18, wherein the identification of the operation indicates a start or an end of a read or a write.

21. The non-transitory computer-readable storage medium of claim 18, wherein the first message includes a timestamp for determining when to send the first message during playback, and wherein the first metadata includes a timestamp for determining when to execute the operation identified by the first metadata.

22. The non-transitory computer-readable storage medium of claim 18, wherein the one or more programs include instructions for:
receiving, via a timing channel, a message including an activation time, wherein the timing channel corresponds to a subscription to timing data published by a timer node different from the second node, and wherein the activation time is used by the second node as a current time during real-time execution.

23. A device comprising:
one or more processors; and
memory storing one or more programs configured to be executed by the one or more processors, the one or more programs including instructions for:
receiving, via a first channel, a first message, wherein the first message includes a first identification of the first message, and wherein the first channel corresponds to a subscription to data published by a first node;
receiving, via a second channel different from the first channel, first metadata corresponding to execution of a second node different from the first node, wherein the first metadata includes:
an identification of an operation performed by the second node and
a second identification of the first message;
in accordance with a determination that one or more criteria are met, outputting, for execution playback, data associated with the first message and the first metadata; and
in accordance with a determination that the one or more criteria are not met, forgoing outputting the data associated with the first message and the first metadata.

24. The device of claim 23, wherein the first metadata includes an indication of a number of triggers.

25. The device of claim 23, wherein the identification of the operation indicates a start or an end of a read or a write.

26. The device of claim 23, wherein the first message includes a timestamp for determining when to send the first message during playback, and wherein the first metadata includes a timestamp for determining when to execute the operation identified by the first metadata.

27. The device of claim 23, wherein the one or more programs include instructions for:
receiving, via a timing channel, a message including an activation time, wherein the timing channel corresponds to a subscription to timing data published by a timer node different from the second node, and wherein the activation time is used by the second node as a current time during real-time execution.

* * * * *